(12) United States Patent
Hagari et al.

(10) Patent No.: US 9,903,290 B2
(45) Date of Patent: Feb. 27, 2018

(54) CONTROLLER AND CONTROL METHOD FOR INTERNAL COMBUSTION ENGINE

(71) Applicant: Mitsubishi Electric Corporation, Tokyo (JP)

(72) Inventors: Hideki Hagari, Tokyo (JP); Kazuhiro Tokuyama, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/189,121

(22) Filed: Jun. 22, 2016

(65) Prior Publication Data
US 2017/0204795 A1    Jul. 20, 2017

(30) Foreign Application Priority Data

Jan. 20, 2016  (JP) .................................. 2016-008444

(51) Int. Cl.
*F02D 41/00* (2006.01)
*F02D 41/14* (2006.01)
(Continued)

(52) U.S. Cl.
CPC .......... *F02D 41/009* (2013.01); *F02D 35/024* (2013.01); *F02D 35/028* (2013.01);
(Continued)

(58) Field of Classification Search
CPC ............ F02D 41/2432; F02D 41/1487; F02D 41/009; F02D 41/0047; F02D 41/0097;
F02D 41/1497; F02D 41/0205; F02D 41/14; F02D 2041/288; F02D 2041/1432; F02D 37/02; F02P 5/145; G01P 15/165; G01P 3/489
(Continued)

(56) References Cited

U.S. PATENT DOCUMENTS 5,047,943 A  *  9/1991  Takahata ............... F02D 41/009
                                                 123/406.51
5,808,186 A  *  9/1998  Matsumoto .......... F02D 41/1498
                                                   73/114.03
(Continued)

FOREIGN PATENT DOCUMENTS

JP         2009-275618 A     11/2009
JP         2013-087724 A      5/2013

*Primary Examiner* — Lindsay Low
*Assistant Examiner* — George Jin
(74) *Attorney, Agent, or Firm* — Sughrue Mion, PLLC; Richard C. Turner

(57) ABSTRACT

There is provided a controller and a control method for an internal combustion engine capable of correcting a detection error of a crankshaft angle with high accuracy. A controller for an internal combustion engine includes an angle information detector that detects an angle interval and a time interval by a specific crank angle sensor; an angle information correction calculator that corrects the angle interval or the time interval by the correction value; an angle information calculator that calculates a crank angle speed, a crank angle acceleration, and an angular acceleration change amount based on the corrected angle interval and the corrected time interval; and a correction value change calculator that change the correction value so that the angular acceleration change amount approaches zero.

10 Claims, 14 Drawing Sheets

(51) Int. Cl.

| | |
|---|---|
| *F02D 37/02* | (2006.01) |
| *F02P 5/145* | (2006.01) |
| *G01M 15/06* | (2006.01) |
| *F02D 35/02* | (2006.01) |
| *G01P 3/44* | (2006.01) |
| *F02D 41/28* | (2006.01) |

(52) U.S. Cl.
CPC ........... *F02D 37/02* (2013.01); *F02D 41/005* (2013.01); *F02D 41/0047* (2013.01); *F02D 41/0097* (2013.01); *F02D 41/1497* (2013.01); *F02P 5/145* (2013.01); *G01M 15/06* (2013.01); *F02D 2041/281* (2013.01); *G01P 3/44* (2013.01); *Y02T 10/47* (2013.01)

(58) Field of Classification Search
USPC .................................. 73/114.15; 364/431.04
See application file for complete search history.

(56) References Cited

U.S. PATENT DOCUMENTS

2009/0282903 A1* 11/2009 Nagano ............... F02D 41/0097
73/114.15
2010/0088010 A1* 4/2010 Verdejo ................. B60K 6/485
701/105

* cited by examiner

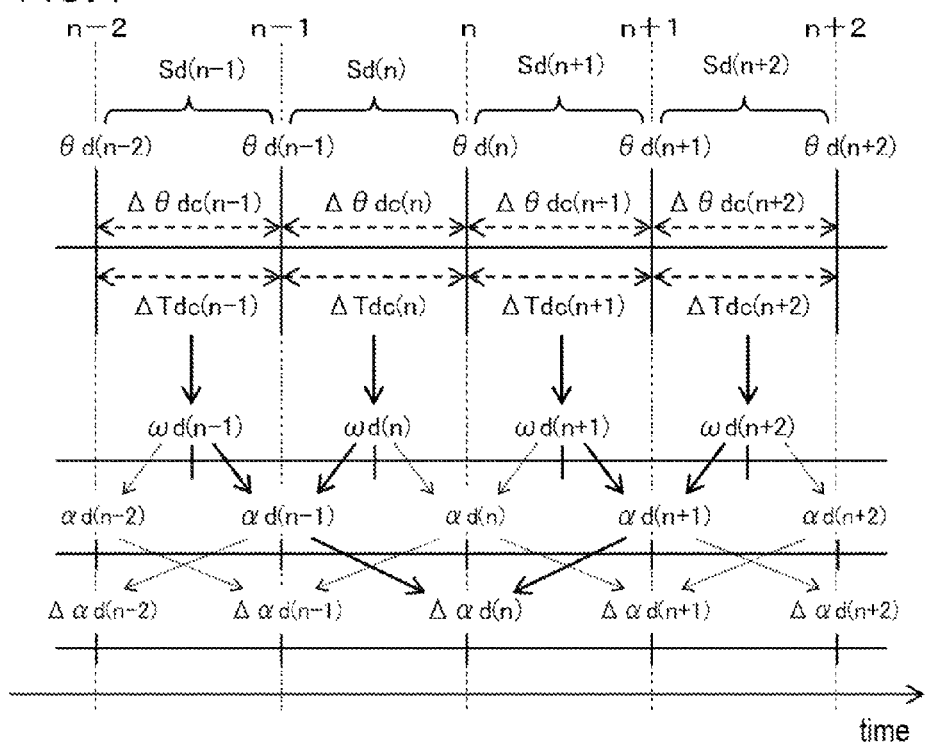

FIG. 12

| STORAGE NUMBER i | 1 | 2 | ... | i-1 | i | i+1 | ... |
|---|---|---|---|---|---|---|---|
| ANGLE IDENTIFICATION NUMBER n | 1 | 2 | ... | 90 | 1 | 2 | ... |
| ANGLE INTERVAL $\Delta\theta d$ | $\Delta\theta d(1)$ | $\Delta\theta d(2)$ | ... | $\Delta\theta d(i-1)$ | $\Delta\theta d(i)$ | $\Delta\theta d(i+1)$ | ... |
| TIME INTERVAL $\Delta Td$ | $\Delta Td(1)$ | $\Delta Td(2)$ | ... | $\Delta Td(i-1)$ | $\Delta Td(i)$ | $\Delta Td(i+1)$ | ... |

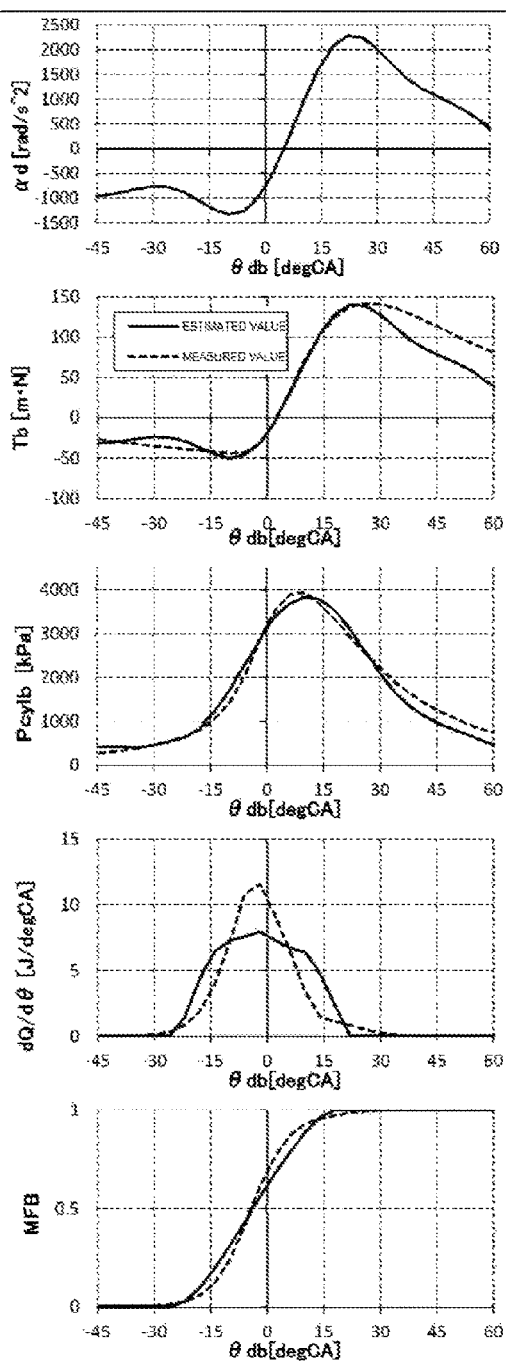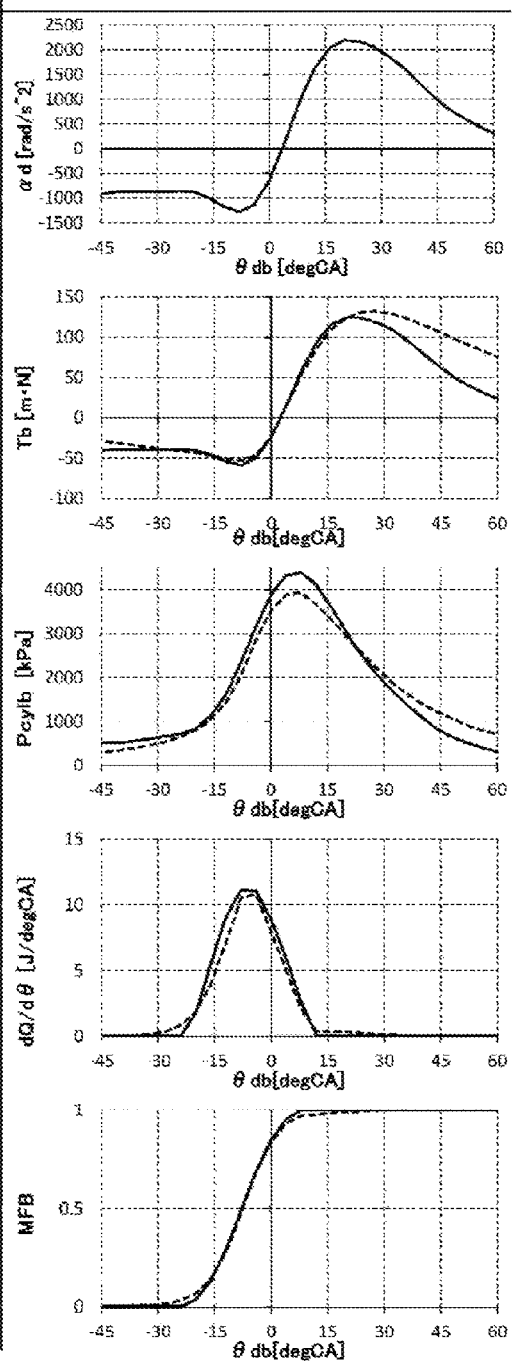
FIG. 16

CONTROLLER AND CONTROL METHOD FOR INTERNAL COMBUSTION ENGINE

INCORPORATION BY REFERENCE

The disclosure of Japanese Patent Application No. 2016-8444 filed on Jan. 20, 2016 including its specification, claims and drawings, is incorporated herein by reference in its entirety.

BACKGROUND

The present invention relates to a controller and a control method for an internal combustion engine that is provided with a plurality of detected units provided in a rotation member, which rotates integrally with a crankshaft, at a plurality of preliminarily set crankshaft angles, and a specific crank angle sensor which is fixed to a nonrotation member and detects the detected unit.

The technology described in Japanese Patent Application Publication No. 2009-275618 and Japanese Patent Application Publication No. 2013-87724 is already known, concerning the above controller. In the technology of JP-A-2009-275618, it is configured to calculate a crank angle speed and a crank angle acceleration based on an output signal of a crank angle sensor, calculate a gas pressure torque which generated by combustion based on the crank angle speed and the crank angle acceleration, and calculate a work by the gas pressure torque.

In the technology of JP-A-2013-87724, it is configured to detect the momentary rotational speed of the crankshaft based on the output signal of the crank angle sensor, calculate a measurement parameter based on the momentary rotational speed, obtain an ideal parameter corresponding to an average speed of the momentary rotational speed from a memory means, and learn an error of the measurement parameter to the ideal parameter.

SUMMARY

By the way, if the detected unit has a manufacture error, a detection error is generated in the crank angle speed and the crank angle acceleration. However, in JP-A-2009-275618, a concrete method how to deal with this detection error is not disclosed. Accordingly, in the technology of JP-A-2009-275618, there is a possibility that the accuracy of a control performed based on the crank angle speed and the crank angle acceleration is deteriorated.

In the technology of JP-A-2013-87724, since it is thought that the ideal parameter changes according to driving condition or external load, there is a possibility that erroneous learning is caused in a learning on the basis of the ideal parameter.

Thus, it is desirable to provide a controller and a control method for an internal combustion engine capable of correcting a detection error of a crankshaft angle with high accuracy.

According to a first aspect of the present invention, a controller for an internal combustion engine is a controller for an internal combustion engine equipped with a plurality of detected units provided in a rotation member, which rotates integrally with a crankshaft, at a plurality of preliminarily set crankshaft angles, and a specific crank angle sensor which is fixed to a nonrotation member and detects the detected unit, the controller for the internal combustion engine includes:

an angle information detector that detects a crankshaft angle based on an output signal of the specific crank angle sensor and detects a detected time which detected the crankshaft angle, and based on a detected angle, which is the detected crankshaft angle, and the detected time, calculates an angle interval and a time interval corresponding to an angle section between the detected angles;

an angle information correction calculator that corrects the angle interval or the time interval in each of the angle sections by a correction value provided one corresponding to each of the angle sections;

an angle information calculator that calculates a crank angle speed which is a time change rate of the crankshaft angle, a crank angle acceleration which is a time change rate of the crank angle speed, and an angular acceleration change amount which is a time change amount of the crank angle acceleration, corresponding to each of the detected angles or the angle sections, based on the corrected angle interval and the corrected time interval by the correction value in each of the angle sections; and a correction value change calculator that changes the correction value in each of the angle sections so that the angular acceleration change amount in each of the detected angles or the angle sections approaches zero.

According to a second aspect of the present invention, a control method for an internal combustion engine is a control method for an internal combustion engine equipped with a plurality of detected units provided in a rotation member, which rotates integrally with a crankshaft, at a plurality of preliminarily set crankshaft angles, and a specific crank angle sensor which is fixed to a nonrotation member and detects the detected unit; the control method for the internal combustion engine includes:

An angle information detecting that detects a crankshaft angle based on an output signal of the specific crank angle sensor and detects a detected time which detected the crankshaft angle, and based on a detected angle, which is the detected crankshaft angle, and the detected time, calculates an angle interval and a time interval corresponding to an angle section between the detected angles;

An angle information correcting that corrects the angle interval or the time interval in each of the angle sections by a correction value provided one corresponding to each of the angle sections;

An angle information calculating that calculates a crank angle speed which is a time change rate of the crankshaft angle, a crank angle acceleration which is a time change rate of the crank angle speed, and an angular acceleration change amount which is a time change amount of the crank angle acceleration, corresponding to each of the detected angles or the angle sections, based on the corrected angle interval and the corrected time interval by the correction value in each of the angle sections; and A correction value changing that changes the correction value in each of the angle sections so that the angular acceleration change amount in each of the detected angles or the angle sections approaches zero.

According to the controller and the control method for the internal combustion engine according to the present invention, a detection error of the crankshaft angle can be corrected with high accuracy by changing the correction value so that the angular acceleration change amount which is the time change amount of the crank angle acceleration approaches zero.

BRIEF DESCRIPTION OF THE DRAWINGS

FIG. 6 is a figure for explaining a correction value stored in a storage apparatus according to Embodiment 1 of the present invention 1.

FIG. 7 is a time chart for explaining an angle information calculation processing according to Embodiment 1 of the present invention;

FIG. 12 is a figure for explaining an angle interval and a time interval which are stored in a storage apparatus according to Embodiment 1 of the present invention;

FIG. 16 is a figure which compares a result in case of a comparative example without correction, with a result in case of Embodiment 1 with correction.

DETAILED DESCRIPTION OF THE EMBODIMENTS

1. Embodiment 1

Figure 1:
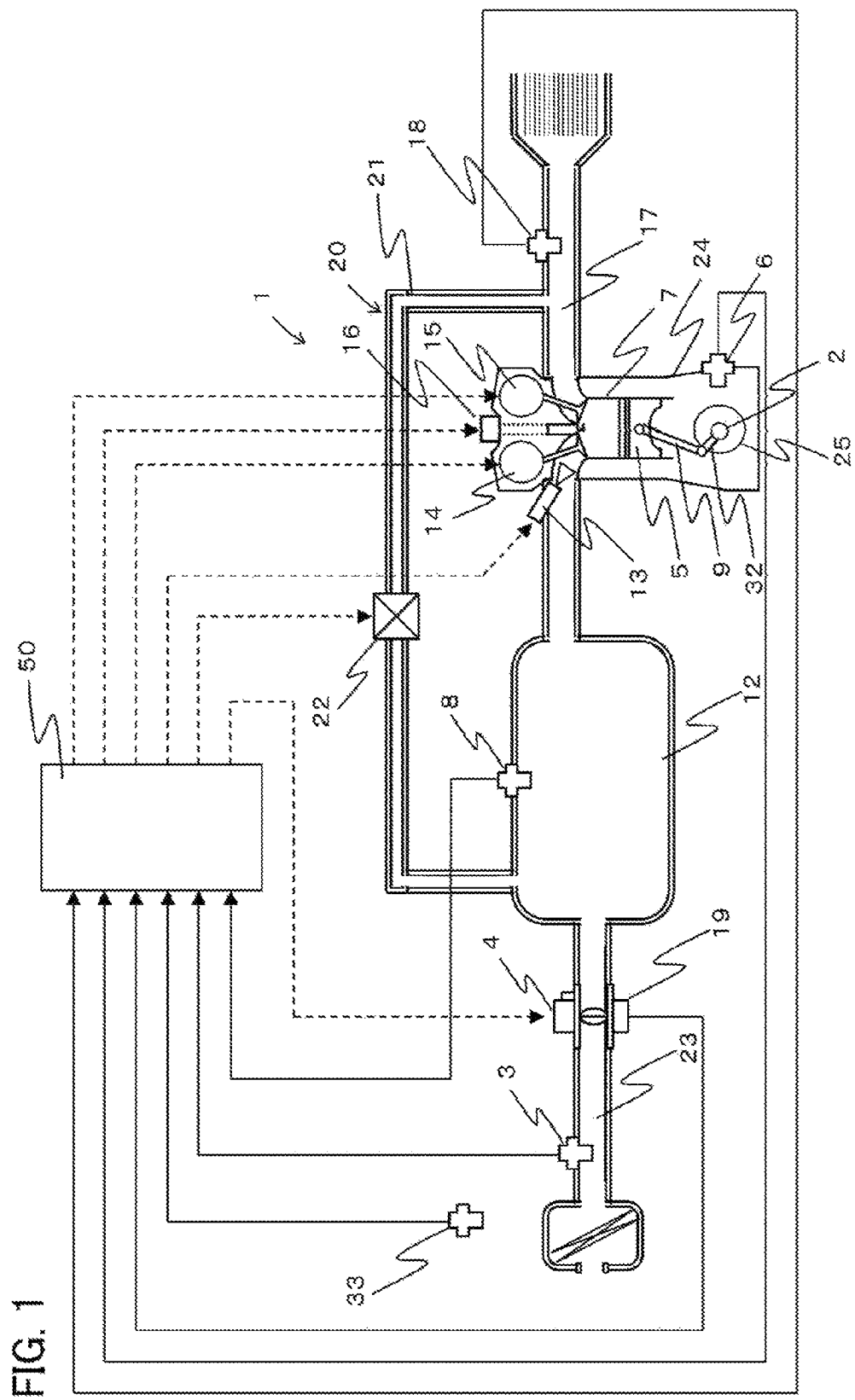
FIG. 1 is a schematic configuration diagram of an internal combustion engine and a controller according to Embodiment 1 of the present invention.
Figure 2:
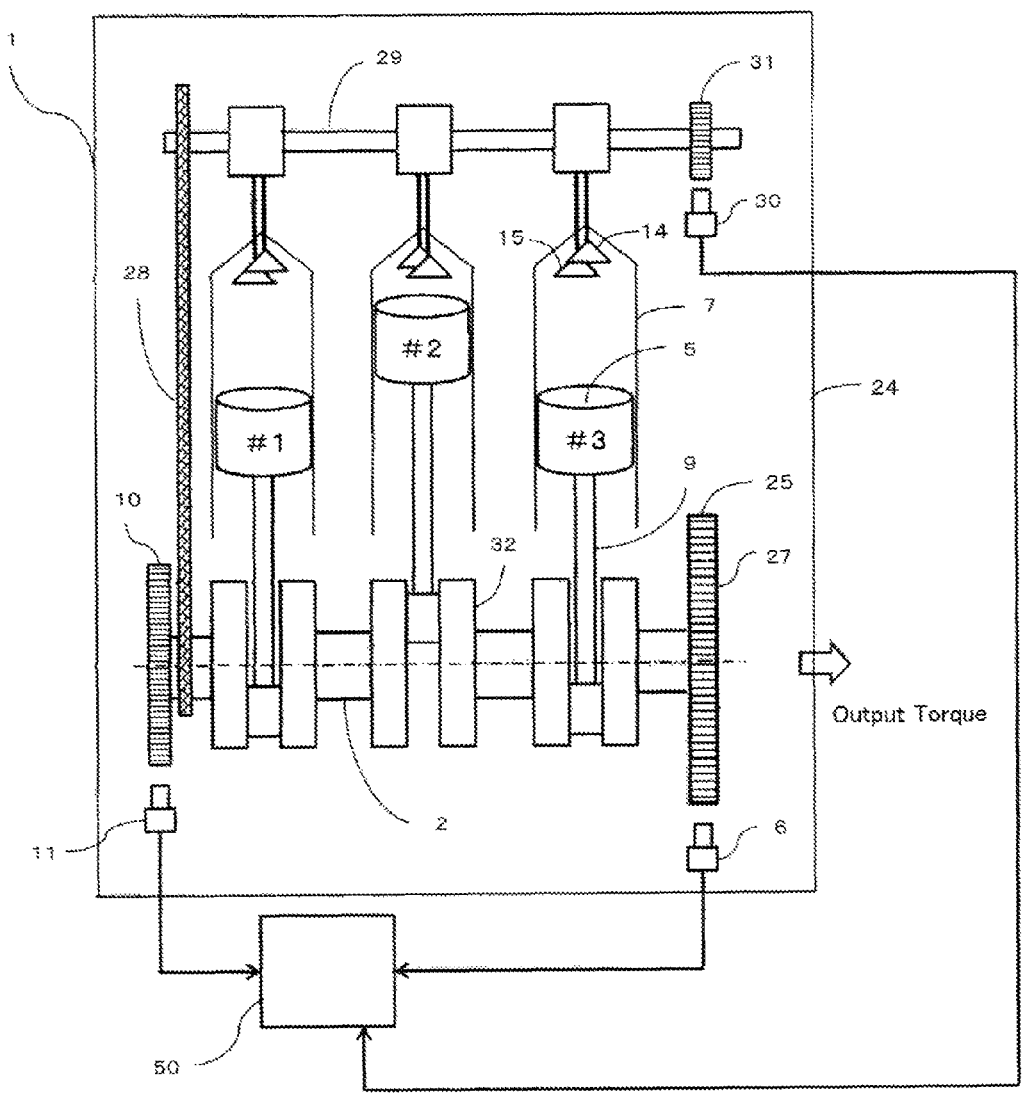
FIG. 2 is a schematic configuration diagram of an internal combustion engine and a controller according to Embodiment 1 of the present invention.
Figure 3:
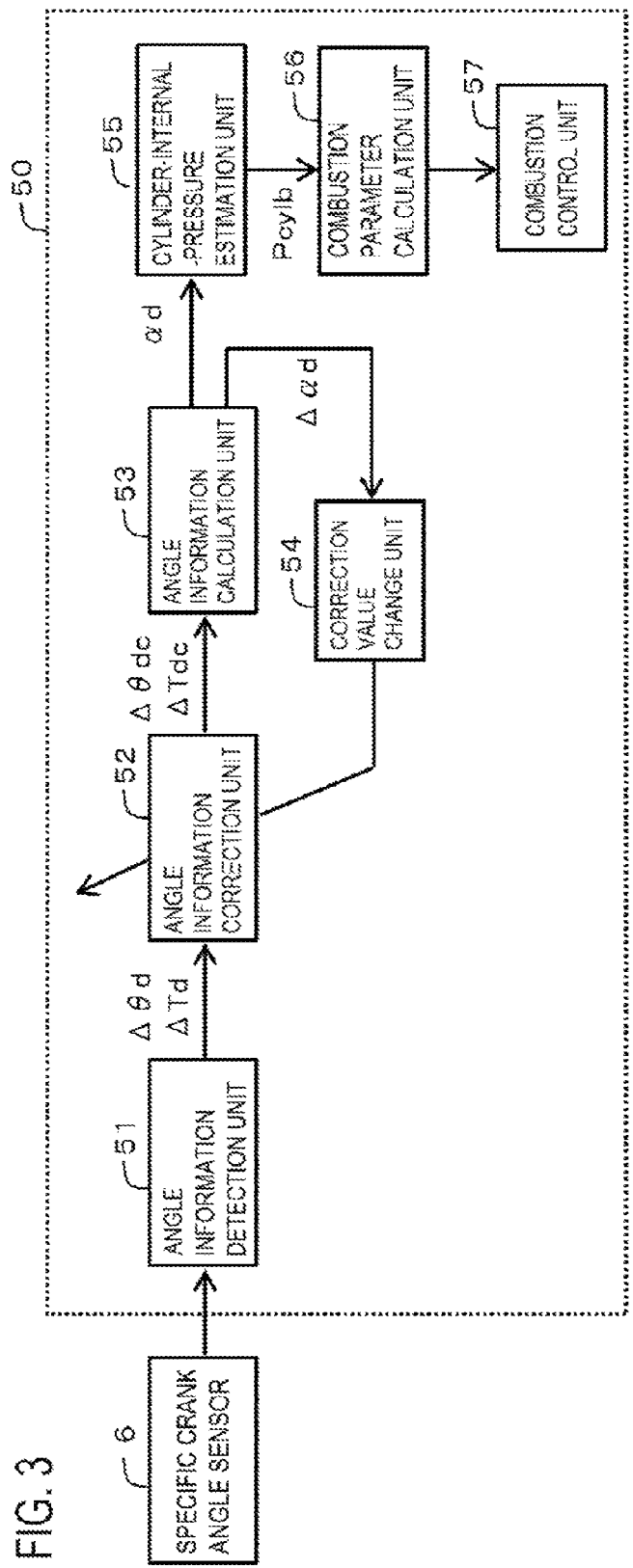
FIG. 3 is a block diagram of a controller according to Embodiment 1 of the present invention.

A controller 50 for an internal combustion engine 1 (hereinafter, referred to simply as the controller 50) according to Embodiment 1 will be explained with reference to the drawings. FIG. 1 and FIG. 2 are a schematic configuration diagram of the internal combustion engine 1 and the controller 50; FIG. 3 is a block diagram of the controller 50 according to Embodiment 1. The internal combustion engine 1 and the controller 50 are mounted in a vehicle; the internal combustion engine 1 functions as a driving force source for the vehicle (wheels).

1-1. The Configuration of the Internal Combustion Engine 1

The configuration of the internal combustion engine 1 will be explained. As shown in FIG. 1, the internal combustion engine 1 is provided with a cylinder 7 in which a fuel-air mixture is combusted. The internal combustion engine 1 is provided with an intake path 23 for supplying air to the cylinders 7 and an exhaust path 17 for discharging exhaust gas from the cylinders 7. The internal combustion engine 1 is a gasoline engine. The internal combustion engine 1 is provided with a throttle valve 4 that opens and closes intake path 23. The throttle valve 4 is an electronically controlled throttle valve by which an opening-and-closing drive is carried out with the electric motor controlled by controller 50. A throttle position sensor 19 that outputs an electric signal according to the opening degree of the throttle valve 4 is provided in the throttle valve 4.

An air flow sensor 3 that outputs an electric signal according to an intake air amount taken into intake path 23 is provided in a part of the intake path 23 of upstream side of the throttle valve 4. An internal combustion engine 1 is provided with an exhaust gas recirculation apparatus 20. An exhaust gas recirculation apparatus 20 has an EGR passage 21 that recirculates exhaust gas from the exhaust path 17 to the intake manifold 12, and an EGR valve 22 that opens and closes the EGR passage 21. An intake manifold 12 is a part of the intake path 23 of downstream side of the throttle valve 4. The EGR valve 22 is an electronic controlled EGR valve which an opening-and-closing drive is carried out with the electric motor controlled by controller 50.

A manifold pressure sensor 8 that outputs an electric signal according to the pressure in the intake manifold 12 is provided in the intake manifold 12. An injector 13 for injecting a fuel is provided at the downstream side part of the intake manifold 12. The injector 13 may be provided in such a way as to inject a fuel directly into the cylinder 7. An atmospheric pressure sensor 33 that outputs an electric signal according to an atmospheric pressure is provided in the internal combustion engine 1.

An ignition plug for igniting a fuel-air mixture and an ignition coil 16 for supplying ignition energy to the ignition plug are provided on the top of the cylinder 7. On the top of the cylinder 7, there are provided an intake valve 14 for adjusting the amount of intake air to be taken from the intake path 23 into the cylinder 7 and an exhaust valve 15 for adjusting the amount of exhaust gas to be exhausted from the cylinder to the exhaust path 17.

As shown in FIG. 2, the internal combustion engine 1 has a plurality of cylinders 7 (in this example, three). A piston 5 is provided inside of the each cylinder 7. The piston 5 of the each cylinder 7 is connected to a crankshaft 2 via a connecting rod 9 and a crank 32. The crankshaft 2 is rotated by reciprocating movement of piston 5. The combustion gas pressure which generated in the each cylinder 7 presses the top face of the piston 5, and rotates the crankshaft 2 via the connecting rod 9 and the crank 32. The crankshaft 2 is connected with a power transfer mechanism which transmits driving force to the wheels. The power transfer mechanism consists of a gearbox, a differential gear and the like.

The internal combustion engine 1 is provided with a signal plate 10 which rotates integrally with the crankshaft 2. A plurality of teeth is provided in the signal plate 10 at a plurality of preliminarily set crankshaft angles. In the present embodiment, the teeth of the signal plate 10 are arranged at intervals of 10 deg. The teeth of the signal plate 10 are provided with a chipped tooth part which chipped a part of teeth. The internal combustion engine 1 is provided with a first crank angle sensor 11 which is fixed to an engine block 24 and detects the tooth of the signal plate 10.

The internal combustion engine 1 is provided with a cam shaft 29 connected with the crankshaft 2 by a chain 28. The cam shaft 29 carries out the opening-and-closing drive of the intake valve 14 and the exhaust valve 15. During the crankshaft 2 rotates two times, the cam shaft 29 rotates once. The internal combustion engine 1 is provided with a signal plate 31 for cam which rotates integrally with the camshaft 29. A plurality of teeth is provided in the signal plate 31 for cam at a plurality of preliminarily set camshaft angles. The internal combustion engine 1 is provided with a cam angle sensor 30 which is fixed to an engine block 24 and detects the tooth of signal plate 31 for cam.

Based on two kinds of output signals of the first crank angle sensor 11 and the cam angle sensor 30, the controller 50 detects a crankshaft angle on the basis of the top dead center of each piston 5 and determines the stroke of each cylinder 7. The internal combustion engine 1 is a 4-stroke engine which has an intake stroke, a compression stroke, an expansion stroke, and an exhaust stroke.

The internal combustion engine 1 is provided with a flywheel 27 which rotates integrally with the crankshaft 2. The peripheral part of flywheel 27 is a ring gear 25, and a plurality of teeth is provided in the ring gear 25 at a plurality of preliminarily set crankshaft angles. The teeth of the ring gear 25 are arranged in the peripheral direction with equiangular intervals. In this example, 90 teeth are provided with intervals of 4 deg. The teeth of ring gear 25 are not provided with a chipped tooth part. The internal combustion engine 1 is provided with a second crank angle sensor 6 which is fixed to the engine block 24 and detects the tooth of the ring gear 25. The second crank angle sensor 6 is disposed oppositely to the ring gear 25 with a space in radial-direction outside of the ring gear 25.

Each of the first crank angle sensor 11, the cam angle sensor 30, and the second crank angle sensor 6 outputs an electric signal according to change of the distance between each sensor and tooth by rotation of the crankshaft 2. The output signal of each angle sensor 11, 30, 6 becomes a rectangular wave which a signal turns on or off in the case where the distance between sensor and tooth is near or in the case where the distance is far. An electromagnetic pickup type sensor is used for each angle sensor 11, 30, 6, for example.

Since the flywheel 27 (the ring gear 25) has more numbers of teeth than the number of teeth of the signal plate 10, and there is also no chipped tooth part, it can expect high resolution angle detection. Since the flywheel 27 has larger mass than the mass of the signal plate 10 and high frequency oscillation is suppressed, it can expect high accuracy of angle detection.

In the present embodiment, the second crank angle sensor 6 corresponds to "a specific crank angle sensor" in the present invention, the flywheel 27 corresponds to the "a rotation member" in the present invention, the tooth of ring gear 25 provided in flywheel 27 corresponds to the "a detected unit" in the present invention, and the engine block 24 corresponds to the "a nonrotation member" in the present invention.

1-2. The Configuration of the Controller 50

Figure 4:
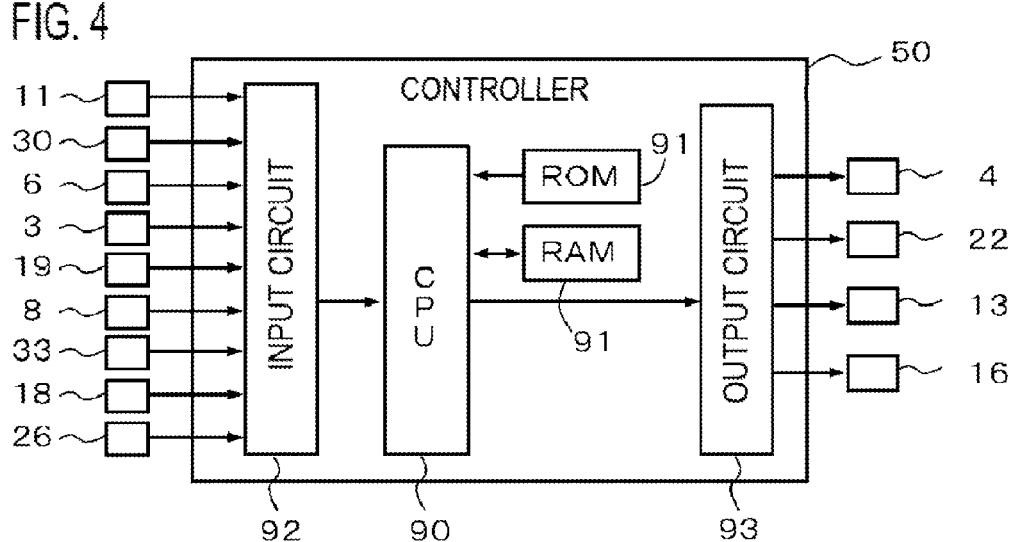
FIG. 4 is a hardware configuration diagram of a controller according to Embodiment 1 of the present invention.

Next, the controller 50 will be explained. The controller 50 is the one whose control subject is the internal combustion engine 1. As shown in FIG. 3, the controller 50 is provided with control units of an angle information detection unit 51 (corresponding to an angle information detector), an angle information correction unit 52 (corresponding to an angle information correction calculator), an angle information calculation unit 53 (corresponding to an angle information calculator), a correction value change unit 54 (corresponding to a correction value change calculator), a cylinder-internal-pressure estimation unit 55 (corresponding to a cylinder-internal-pressure estimation calculator), a combustion parameter calculation unit 56 (corresponding to a combustion parameter calculator), a combustion control unit 57 (corresponding to a combustion controller), and the like. The respective control units 51 through 57 and the like of the controller 50 are realized by processing circuits included in the controller 50. Specifically, as shown in FIG. 4, the controller 50 includes, as a processing circuit, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

As the storage apparatuses 91, there are provided a RAM (Random Access Memory) that can read data and write data from the computing processing unit 90, a ROM (Read Only Memory) that can read data from the computing processing unit 90, and the like. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for outputting a control signal from the computing processing unit 90.

In addition, the computing processing unit 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51 through 57 included in the controller 50 are realized. Setting data items such as tables and determination values to be utilized in the control units 51 through 57 are stored, as part of software items (programs), in the storage apparatus 91 such as a ROM. Data items, which the respective control units 51 through 57 calculated, such as a correction value Kc, an angle interval $\Delta\theta d$, a time interval $\Delta Td$, respective computed values, and respective detection values are stored in the rewritable storage apparatus 91 such as a RAM.

In the present embodiment, the input circuit 92 is connected with the first crank angle sensor 11, the cam angle sensor 30, the second crank angle sensor 6, the air flow sensor 3, the throttle position sensor 19, the manifold pressure sensor 8, the atmospheric pressure sensor 33, the air fuel ratio sensor 18, an accelerator position sensor 26, and the like. The output circuit 93 is connected with the throttle valve 4 (electric motor), the EGR valve 22 (electric motor), the injector 13, the ignition coil 16, and the like. The controller 50 is connected with various kinds of unillustrated sensors, switches, actuators, and the like. The controller 50 detects driving conditions of the internal combustion engines 1, such as an intake air amount, a pressure in the intake manifold 12, an atmospheric pressure, an air-fuel ratio, and an accelerator opening degree, based on the output signals of various sensors.

As basic control, the controller 50 calculates a fuel injection amount, ignition timing, and the like, based on inputted output signals and the like from the various kinds of sensors, and then performs driving control of the injector 13, the ignition coil 16, and the like. Based on the output signal of the accelerator position sensor 26 and the like, the controller 50 calculates a demanded output torque of the internal combustion engine 1 by the driver, and then controls the throttle valve 4 and the like so that an intake air amount for realizing the demanded output torque is obtained. Specifically, the controller 50 calculates a target throttle opening degree and then performs driving control of the electric motor of the throttle valve 4 so that the throttle opening degree, detected based on the output signal of the throttle position sensor 19, approaches the target throttle opening degree. And the controller 50 calculates a target opening degree of the EGR valve 22 based on inputted output signals and the like from the various kinds of sensors and then performs driving control of the electric motor of the EGR valve 22.

<Angle Information Detection Unit 51>

Figure 5:
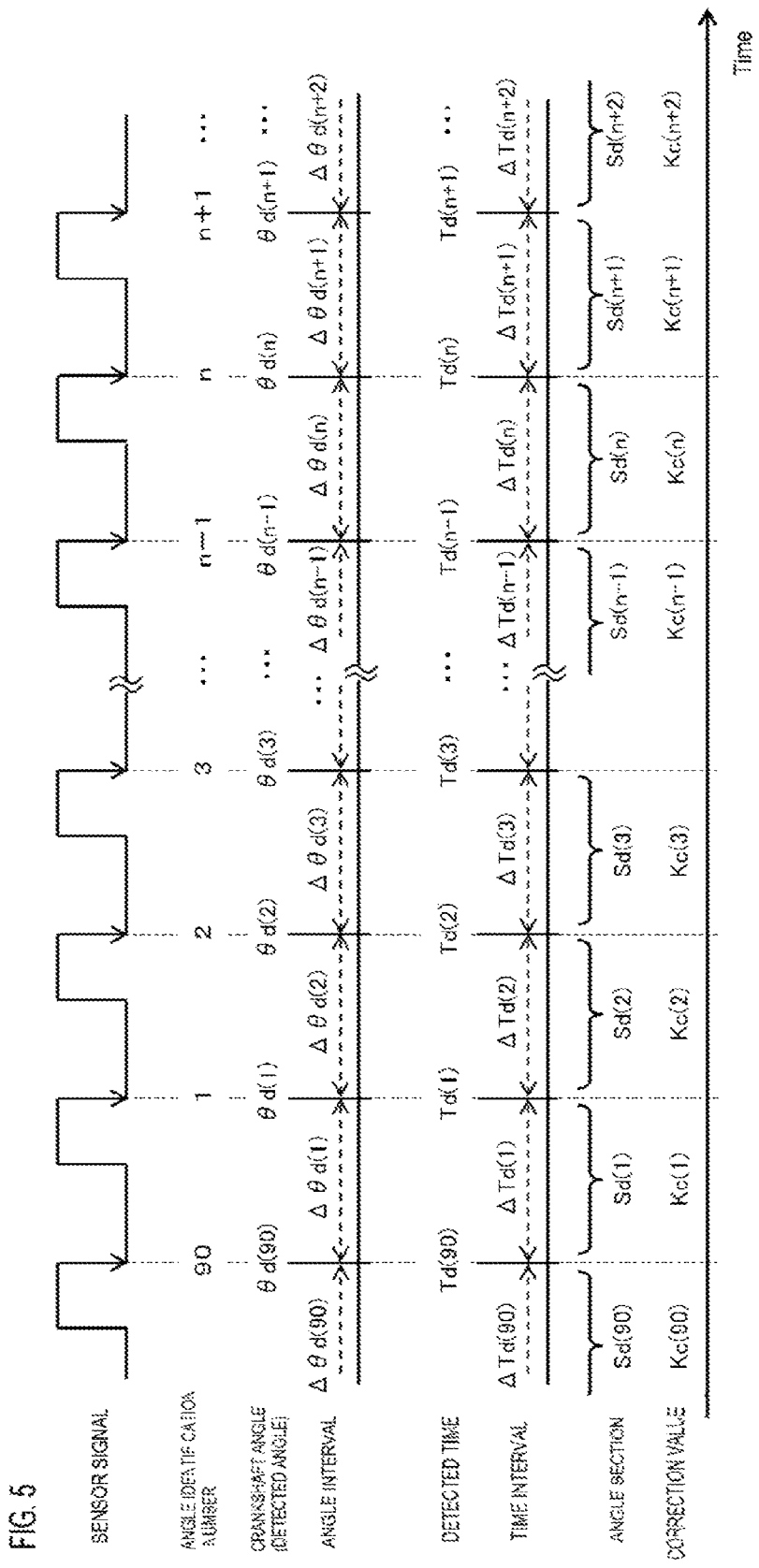
FIG. 5 is a time chart for explaining an angle information detection processing according to Embodiment 1 of the present invention.

As shown in FIG. 5, the angle information detection unit 51 detects a crankshaft angle θd based on the output signal of the second crank angle sensor 6 used as the specific crank angle sensor and detects a detected time Td which detected the crankshaft angle θd. And based on a detected angle θd, which is the detected crankshaft angle θd, and the detected time Td, the angle information detection unit 51 calculates an angle interval Δθd and a time interval ΔTd corresponding to an angle section Sd between the detected angles θd.

In the present embodiment, the angle information detection unit 51 determines the crankshaft angle θd when falling edge (or rising edge) of the output signal (rectangular wave) of the second crank angle sensor 6 is detected. The angle information detection unit 51 determines a basing point falling edge which is a falling edge corresponding to a basing point angle (for example, 0 deg which is a top dead center of the piston 5 of the first cylinder 7), and determines the crankshaft angle θd corresponding to number n of the falling edge which is counted up on the basis of the basing point falling edge (hereinafter, referred to as an angle identification number n). For example, when the basing point falling edge is detected, the angle information detection unit 51 sets the crankshaft angle θd to the basing point angle (for example, 0 deg), and sets the angle identification number n to 0. And every time the falling edge is detected, the angle information detection unit 51 increases the crankshaft angle θd by a preliminarily set angle interval Δθd (in this example, 4 deg) and increases the angle identification number n by one. Alternatively, the angle information detection unit 51 may read out the crankshaft angle θd corresponding to the this time angle identification number n, by use of an angle table in which the relationship between the angle identification number n and the crankshaft angle θd is preliminarily set. The angle information detection unit 51 correlates the crankshaft angle θd (the detected angle θd) with the angle identification number n. The angle identification number n returns to 1 after a maximum number (in this example, 90). The last time angle identification number n of the angle identification number n=1 is 90, and the next time angle identification number n of the angle identification number n=90 is 1.

In the present embodiment, as described later, the angle information detection unit 51 determines the basing point falling edge of the second crank angle sensor 6 with reference to a reference crankshaft angle θr detected based on the first crank angle sensor 11 and the cam angle sensor 30. For example, the angle information detection unit 51 determines the falling edge of the second crank angle sensor 6, which the reference crankshaft angle θr, becomes the closest to the basing point angle, as the basing point falling edge.

The angle information detection unit 51 determines the stroke of each cylinder 7 corresponding to the crankshaft angle θd by referring to the stroke of each cylinder 7 determined based on the first crank angle sensor 11 and the cam angle sensor 30.

The angle information detection unit 51 detects the detected time Td at the time that the falling edge of the output signal (rectangular wave) of the second crank angle sensor 6 is detected, and correlates the detected time Td with the angle identification number n. Specifically, the angle information detection unit 51 detects the detected time Td using the timer function provided in the computing processing unit 90.

As shown in FIG. 5, when a falling edge is detected, the angle information detection unit 51 sets the angle section between the detected angle θd (n) corresponding to the this time angle identification number (n) and the detected angle θd (n−1) corresponding to the last time angle identification number (n−1), as the angle section Sd (n) corresponding to the this time angle identification number (n).

As shown in an equation (1), when a falling edge is detected, the angle information detection unit 51 calculates the deviation between the detected angle θd (n) corresponding to the this time angle identification number (n) and the detected angle θd (n−1) corresponding to the last time angle identification number (n−1), and sets the calculated deviation as the angle interval Δθd (n) corresponding to the this time angle identification number (n) (the this time angle section Sd (n)).

$$\Delta\theta d(n)=\theta d(n)-\theta d(n-1) \qquad (1)$$

In the present embodiment, since all the angle intervals of teeth of the ring gear 25 are made equal, the angle information detection unit 51 sets a preliminarily set angle (in this example, 4 deg) as the angle interval Δθd of all the angle identification numbers n.

As shown in an equation (2), when a falling edge is detected, the angle information detection unit 51 calculates the deviation between the detected time Td (n) corresponding to the this time angle identification number (n) and the detected time Td (n−1) corresponding to the last time angle identification number (n−1), and sets the calculated deviation as the time interval ΔTd (n) corresponding to the this time angle identification number (n) (the this time angle section Sd (n)).

$$\Delta Td(n)=Td(n)-Td(n-1) \qquad (2)$$

Based on two kinds of output signals of the first crank angle sensor 11 and the cam angle sensor 30, the angle information detection unit 51 detects the reference crankshaft angle θr on the basis of the top dead center of the piston 5 of the first cylinder 7, and determines the stroke of each cylinder 7. For example, the angle information detection unit 51 determines the falling edge just after the chipped tooth part of the signal plate 10 based on the time interval of the falling edge of the output signal (rectangular wave) of the first crank angle sensor 11. And the angle information detection unit 51 determines the correspondency between the each falling edge on the basis of the falling edge just after the chipped tooth part, and the reference crankshaft angle θr on the basis of the top dead center, and calculates the reference crankshaft angle θr on the basis of the top dead center at the time that the each falling edge is detected. The angle information detection unit 51 determines the stroke of each cylinder 7 based on the relationship between the position of the chipped tooth part in the output signal (rectangular wave) of the first crank angle sensor 11, and the output signal (rectangular wave) of the cam angle sensor 30.

<Angle Information Correction Unit 52>

The angle information correction unit 52 corrects the angle interval $\Delta\theta d$ or the time interval $\Delta Td$ in each of the angle sections Sd by a correction value Kc provided one corresponding to each of the angle sections Sd.

In the present embodiment, the angle information correction unit 52 provides one correction value Kc (n) in the every angle section Sd (n) of the each angle identification number n. In this example, since the angle identification number n and the angle section Sd are provided 90, the correction value Kc is also provided 90. As shown in FIG. 6, the each correction value Kc is correlated with the each angle identification number n, and is stored in the rewritable storage apparatus 91 such as RAM of the controller 50.

As shown in an equation (3), the angle information correction unit 52 multiplies the correction value Kc (n) corresponding to the this time angle identification number (n) to the angle interval $\Delta\theta d$ (n) or the time interval $\Delta Td$ (n) corresponding to the this time angle identification number (n), so as to calculate the corrected angle interval $\Delta\theta dc$ (n) or the corrected time interval $\Delta Tdc$ (n) corresponding to the this time angle identification number (n).

$$\Delta\theta dc(n)=Kc(n)\times\Delta\theta d(n)$$

or $$\Delta Tdc(n)=Kc(n)\times\Delta Td(n) \quad (3)$$

In the present embodiment, the case where the time interval $\Delta Td$ is corrected by the correction value Kc is explained. The angle interval $\Delta\theta d$ which is not corrected by the correction value Kc is also called as the corrected angle interval $\Delta\theta dc$, for convenience of explanation.

<Angle Information Calculation Unit 53>

Based on the corrected angle interval $\Delta\theta dc$ and the corrected time interval $\Delta Tdc$ by the correction value Kc in each of the angle sections Sd, the angle information calculation unit 53 calculates a crank angle speed $\omega d$, which is a time change rate of the crankshaft angle $\theta d$, a crank angle acceleration $\alpha d$ which is a time change rate of the crank angle speed $\omega d$, and an angular acceleration change amount $\Delta\alpha d$ which is a time change amount of the crank angle acceleration $\alpha d$, corresponding to each of the detected angles $\theta d$ or the angle sections Sd.

In the present embodiment, as shown in FIG. 7, based on the corrected angle interval $\Delta\theta dc$ (n) and the corrected time interval $\Delta Tdc$ (n) corresponding to the angle section Sd (n) made into a processing object, the angle information calculation unit 53 calculates the crank angle speed $\omega d$ (n) corresponding to the angle section Sd (n) of a processing object. Specifically, as shown in an equation (4), the angle information calculation unit 53 divides the corrected angle interval $\Delta\theta dc$ (n) by the corrected time interval $\Delta Tdc$ (n) corresponding to the angle section Sd (n) of a processing object so as to calculate the crank angle speed $\omega d$ (n).

$$\omega d(n)=\Delta\theta dc(n)/\Delta Tdc(n) \quad (4)$$

Based on the crank angle speed $\omega d$ (n) and the corrected time interval $\Delta Tdc$ (n), corresponding to the just before one angle section Sd (n) of the detected angle $\theta d$ (n) made into a processing object, and the crank angle speed $\omega d$ (n+1) and the corrected time interval $\Delta Tdc$ (n+1), corresponding to the just after one angle section Sd (n+1) of the detected angle $\theta d$ (n) of a processing object, the angle information calculation unit 53 calculates the crank angle acceleration $\alpha d$ (n) corresponding to the detected angle $\theta d$ (n) of a processing object. Specifically, as shown in an equation (5), the angle information calculation unit 53 divides the subtraction value, which subtracted the just before crank angle speed $\omega d$ (n) from the just after crank angle speed $\omega d$ (n+1), by an average value of the just after corrected time interval $\Delta Tdc$ (n+1) and the just before corrected time interval $\Delta Tdc$ (n) so as to calculate the crank angle acceleration $\alpha d$ (n).

$$\alpha d(n)=\{\omega d(n+1)-\omega d(n)\}/\{\Delta Tdc(n+1)+\Delta Tdc(n)\}\times 2 \quad (5)$$

Based on the crank angle acceleration $\alpha d$ (n−1) corresponding to the just before detected angle $\theta d$ (n−1) of the detected angle $\theta d$ (n) made into a processing object, and the crank angle acceleration ad (n+1) corresponding to the just after detected angle $\theta d$ (n+1) of the detected angle $\theta d$ (n) of a processing object, the angle information calculation unit 53 calculates an angular acceleration change amount $\Delta\alpha d$ (n) corresponding to the detected angle $\theta d$ (n) of a processing object. Specifically, as shown in an equation (6), the angle information calculation unit 53 subtract the just before crank angle acceleration $\alpha d$ (n−1) from the just after crank angle acceleration $\alpha d$ (n+1) so as to calculate angular acceleration change amount $\Delta\alpha d$ (n). In this way, it is configured to calculate the angular acceleration change amount $\Delta\alpha d$ by a central difference.

$$\Delta\alpha d(n)=\alpha d(n+1)-\alpha d(n-1) \quad (6)$$

To summarize the above processing, the following processing are performed in order to calculate the one angular acceleration change amount $\Delta\alpha d$ (n). Based on the corrected angle interval $\Delta\theta dc$ and the corrected time interval $\Delta Tdc$ in each of the just before two angle sections Sd (n−1), Sd (n) and the just after two angle sections Sd (n+1), Sd (n+2) of an object detected angle $\theta d$ (n) which is the detected angle $\theta d$ at which the angular acceleration change amount $\Delta\alpha d$ (n) is calculated, the angle information calculation unit 53 calculates the crank angle speed $\omega d$ (n−1), $\omega d$ (n), $\omega d$ (n+1), $\omega d$ (n+2) in each of the just before two and the just after two angle sections Sd.

Then, based on the crank angle speed $\omega d$ (n−1), $\omega d$ (n) and the time interval $\Delta Td$ (n−1), $\Delta Td$ (n) in each of the just before two angle sections Sd of the object detected angle $\theta d$ (n), the angle information calculation unit 53 calculates the one crank angle acceleration $\alpha d$ (n−1) corresponding to the just before two angle sections Sd. And, based on the crank angle speed $\omega d$ (n+1), $\omega d$ (n+2) and the time interval $\Delta Td$ (n+1), $\Delta Td$ (n+2) in each of the just after two angle sections Sd of the object detected angle $\theta d$ (n), the angle information calculation unit 53 calculates the one crank angle acceleration $\alpha d$ (n+1) corresponding to the just after two angle sections Sd. Then, based on the crank angle acceleration $\alpha d$ (n−1) corresponding to the just before two angle sections Sd of the object detected angle $\theta d$ (n), and the crank angle acceleration $\alpha d$ (n+1) corresponding to the just after two angle sections Sd, the angle information calculation unit 53 calculates the one angular acceleration change amount $\Delta\alpha d$ (n) corresponding to the object detected angle $\theta d$ (n).

In the present embodiment, the angle information calculation unit 53 calculates a crank angle jerk $\delta d$ which is a time change rate of the crank angle acceleration $\alpha d$ as the angular acceleration change amount $\Delta\alpha d$. Specifically, as shown in an equation (7), the angle information calculation unit 53 divides the subtraction value, which subtracted the just before crank angle acceleration $\alpha d$ (n−1) from the just after crank angle acceleration $\alpha d$ (n+1) of the object detected angle $\theta d$ (n), by the total value of the just after corrected time interval $\Delta Tdc$ (n+1) and the just before corrected time interval ΔTdc (n) of the object detected angle θd (n), so as to calculate the crank angle jerk δd (n) of the object detected angle θd (n).

$$\delta d(n) = \{\alpha d(n+1) - \alpha d(n-1)\} / \{\Delta Tdc(n+1) + \Delta Tdc(n)\} \quad (7)$$

As mentioned above, in order to calculate the angular acceleration change amount Δαd or the crank angle jerk δd, the angle interval Δθd and the time interval ΔTd of the just after two angle sections Sd (n+1), Sd (n+2) of the object detected angle θd (n) are necessary. Therefore, the angle information calculation unit 53 sets the detected angle θd which is at least two later than the newest detected angle θd as the object detected angle, and performs calculation of the angular acceleration change amount Δαd or the crank angle jerk δd.

<Correction Value Change Unit 54>

The correction value change unit 54 changes the correction value Kc in each of the angle sections Sd so that the angular acceleration change amount Δαd (or the crank angle jerk δd) in each of the detected angles θd or the angle sections Sd (in this example, the detected angles θd) approaches zero.

Figure 8:
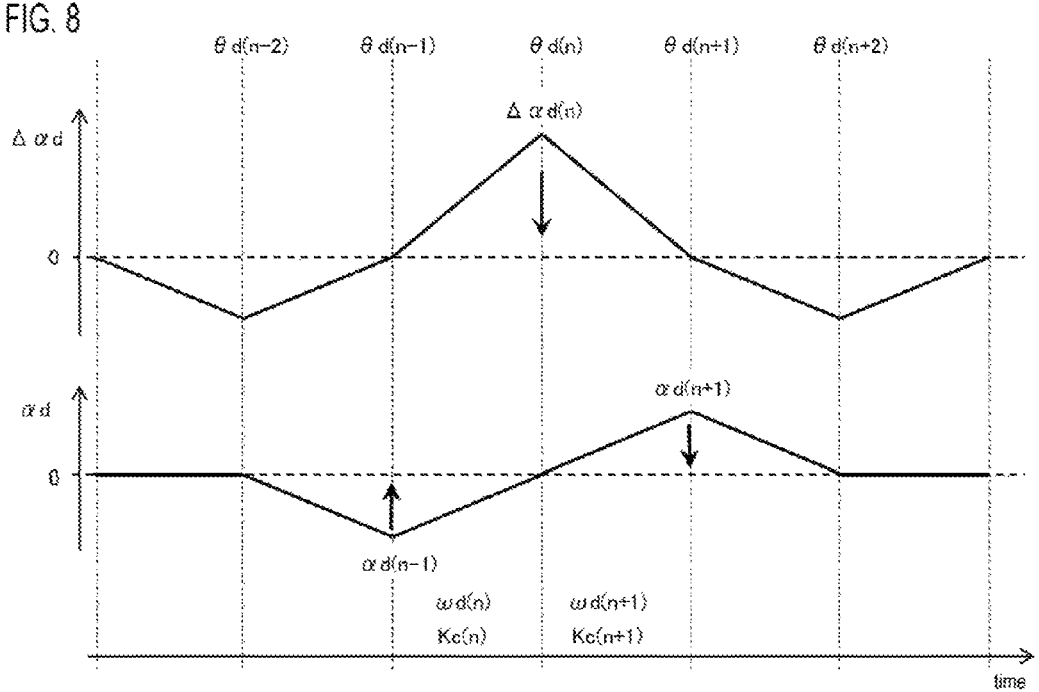
FIG. 8 is a time chart for explaining a change of a correction value in the case where an angular acceleration change amount is larger than zero according to Embodiment 1 of the present invention.

As shown in the example of FIG. 8, in the case where the angular acceleration change amount Δαd (n) of the object detected angle θd (n) is larger than zero, the just after crank angle acceleration αd (n+1) of the object detected angle θd (n) is larger than the just before crank angle acceleration αd (n−1), and the crank angle acceleration αd is increasing. Therefore, in order to bring the angular acceleration change amount Δαd (n) close to zero, the just before crank angle acceleration αd (n−1) may be increased, or the just after crank angle acceleration αd (n+1) may be decreased.

In order to increase the just before crank angle acceleration αd (n−1), the just before crank angle speed ωd (n) may be increased. For that purpose, the just before correction value Kc (n) may be changed so that the just before corrected angle interval Δθdc (n) increases, or so that the just before corrected time interval ΔTdc (n) decreases. On the other hand, in order to decrease the just after crank angle acceleration αd (n+1), the just after crank angle speed ωd (n+1) may be decreased. For that purpose, the just after correction value Kc (n+1) may be changed so that the just after corrected angle interval Δθdc (n+1) decreases, or so that the just after corrected time interval ΔTdc (n+1) increases.

Figure 9:
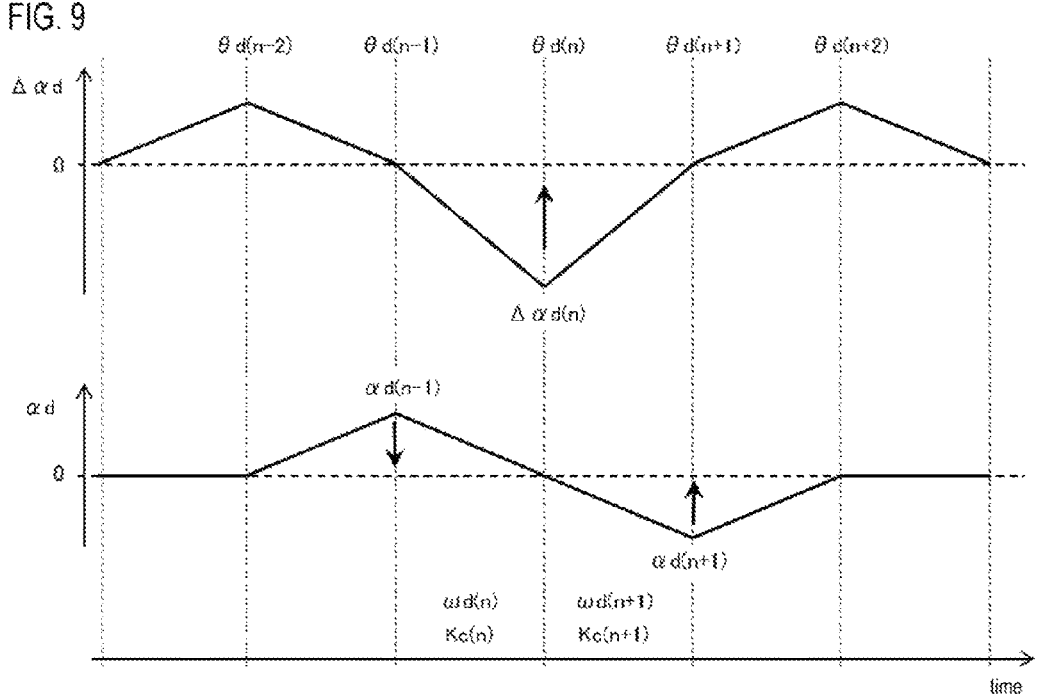
FIG. 9 is a time chart for explaining a change of a correction value in the case where an angular acceleration change amount is smaller than zero according to Embodiment 1 of the present invention.

On the other hand, be shown in an example of FIG. 9, in the case where the angular acceleration change amount Δαd (n) of the object detected angle θd (n) is smaller than zero, the just after crank angle acceleration αd (n+1) of the object detected angle θd (n) is smaller than the just before crank angle acceleration αd (n−1), and the crank angle acceleration αd is decreasing. Therefore, in order to bring the angular acceleration change amount Δαd (n) close to zero, the just before crank angle acceleration αd (n−1) may be decreased, or the just after crank angle acceleration αd (n+1) may be increased.

In order to decrease the just before crank angle acceleration ad (n−1), the just before crank angle speed ωd (n) may be decreased. For that purpose, the just before correction value Kc (n) may be changed so that the just before corrected angle interval Δθdc (n) decreases, or so that the just before corrected time interval ΔTdc (n) increases. On the other hand, in order to increase the just after crank angle acceleration αd (n+1), the just after crank angle speed ωd (n+1) may be increased. For that purpose, the just after correction value Kc (n+1) may be changed so that the just after corrected angle interval Δθdc (n+1) increases, or so that the just after corrected time interval ΔTdc (n+1) decreases.

Therefore, the correction value change unit 54 is configured as follows. First, the case where it is configured to correct the angle interval Δθd by the correction value Kc is explained. In the case where the angular acceleration change amount Δαd (n) of the object detected angle θd (n) is a positive value, the correction value change unit 54 performs one or both of an increase correction to which the correction value Kc (n) of the just before one angle section Sd (n) of the object detected angle θd (n) is changed (in this example, increased) so as to increase the corrected angle interval Δθdc (n) of the just before one angle section Sd (n), and a decrease correction to which the correction value Kc (n+1) of the just after one angle section Sd (n+1) of the object detected angle θd (n) is changed (in this example, decreased) so as to decrease the corrected angle interval Δθdc (n+1) of the just after one angle section Sd (n+1). On the other hand, in the case where the angular acceleration change amount Δαd (n) of the object detected angle θd (n) is a negative value, the correction value change unit 54 performs one or both of a decrease correction to which correction value Kc (n) of the just before one angle section Sd (n) of the object detected angle θd (n) is changed (in this example, decreased) so as to decrease the corrected angle interval Δθdc (n) of the just before one angle section Sd (n), and an increase correction to which correction value Kc (n+1) of the just after one angle section Sd (n+1) of the object detected angle θd (n) is changed (in this example, increased) so as to increase the corrected angle interval Δθdc (n+1) of the just after one angle section Sd (n+1).

Next, the case where the time interval ΔTd is corrected by the correction value Kc is explained. In the case where the angular acceleration change amount Δαd (n) of the object detected angle θd (n) is a positive value, the correction value change unit 54 performs one or both of a decrease correction to which the correction value Kc (n) of the just before one angle section Sd (n) of the object detected angle θd (n) is changed (in this example, decreased) so as to decrease the corrected time interval ΔTdc (n) of the just before one angle section Sd (n), and an increase correction to which the correction value Kc (n+1) of the just after one angle section Sd (n+1) of the object detected angle θd (n) is changed (in this example, increased) so as to increase the corrected time interval ΔTdc (n+1) of the just after one angle section Sd (n+1). On the other hand, in the case where the angular acceleration change amount Δαd (n) of the object detected angle θd (n) is a negative value, the correction value change unit 54 performs one or both of an increase correction to which the correction value Kc (n) of the just before one angle section Sd (n) of the object detected angle θd (n) is changed (in this example, increased) so as to increase the corrected time interval ΔTdc (n) of the just before one angle section Sd (n), and a decrease correction to which the correction value Kc (n+1) of the just after one angle section Sd (n+1) of the object detected angle θd (n) is changed (in this example, decreased) so as to decrease the corrected time interval ΔTdc (n+1) of the just after one angle section Sd (n+1).

The correction value change unit 54 increases or decreases the correction value Kc of the each angle section Sd by a preliminarily set change amount ΔKc. The correction value change unit 54 may be configured to change the change amount ΔKc according to an absolute value of the angular acceleration change amount Δαd of the each angle section Sd. In this case, the correction value change unit 54 increases the change amount ΔKc as the absolute value of the angular acceleration change amount $\Delta\alpha d$ of the each angle section Sd becomes large. In the case where the absolute value of the angular acceleration change amount $\Delta\alpha d$ of the each angle section Sd is less than or equal to a preliminarily set dead zone determination value, the correction value change unit 54 may be configured to perform a dead zone processing to which the correction value Kc is not changed.

<Change Permission Conditions of Correction Value Kc>

Figure 10:
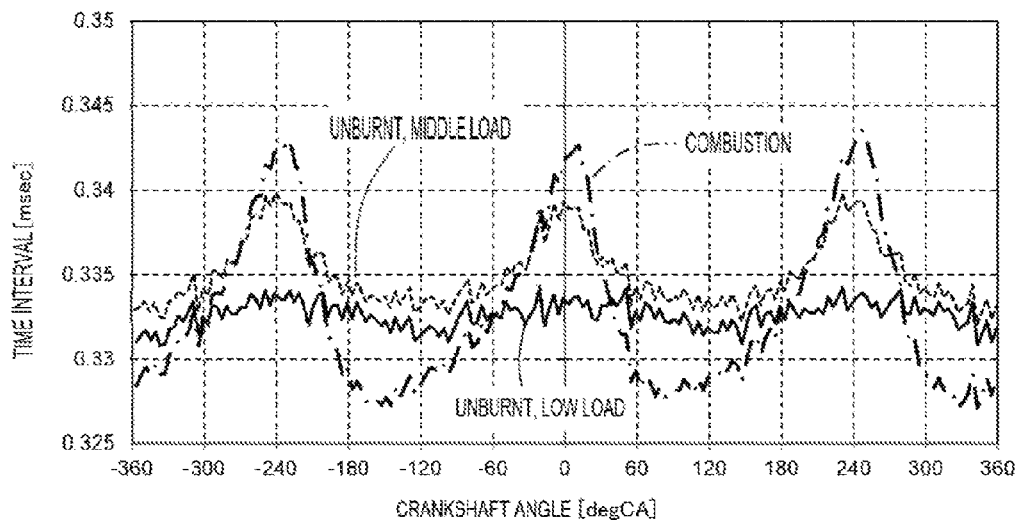
FIG. 10 is a chart which shows a behavior of a time interval in different driving conditions according to Embodiment 1 of the present invention.

As shown in FIG. 10, in the case where fuel is supplied to the internal combustion engine 1 and it is burning (shown by the dashed dotted line), since a pressure fluctuation in the cylinder 7 due to combustion is large, a temporal change of the time interval $\Delta Td$ becomes large, and a temporal change of the crank angle speed becomes large. In the case where fuel supply was stopped and combustion stops and the load of the internal combustion engine 1 is a medium degree (shown by the broken line), although the pressure fluctuation in the cylinder 7 decreases rather than the time of combustion, the air amount taken into in the cylinder 7 is much, and the pressure fluctuation range of air in the cylinder 7 becomes large. For this reason, the temporal change of the time interval and the crank angle speed decreases rather than the time of combustion, however does not fully decrease.

Figure 11:
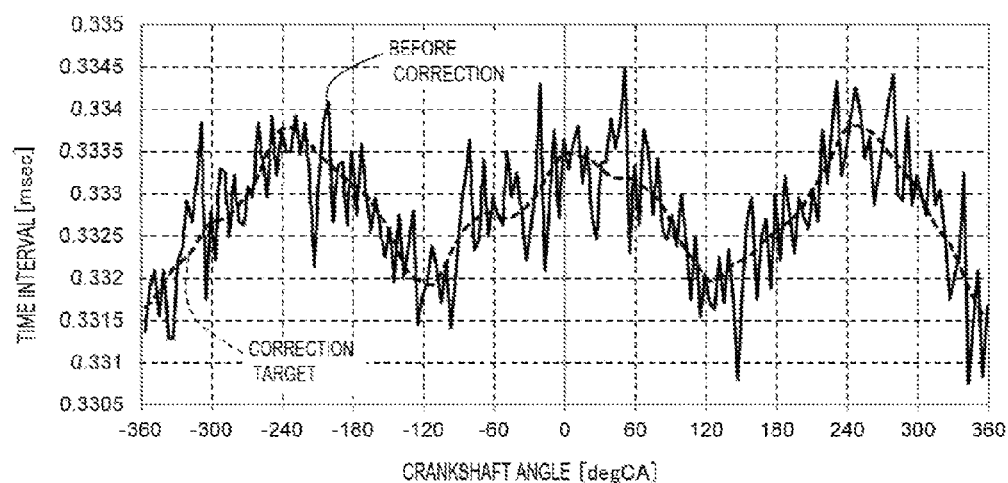
FIG. 11 is a chart which shows a behavior of a time interval in driving condition of unburnt and low load according to Embodiment 1 of the present invention.

In the case where fuel supply is stopped and the load of the internal combustion engine 1 is low (shown by the solid line), the air amount taken into in the cylinder 7 is little, and the pressure fluctuation range of air in the cylinder 7 decreases significantly. For this reason, the temporal change of the time interval and the crank angle speed decreases significantly, and the rotation of the crankshaft 2 becomes close to a uniform circular motion. However, air remains in the cylinder 7 and the pressure fluctuation of air in the cylinder 7 is generated slightly. As shown in FIG. 11 which expands the vertical axis of FIG. 10, the temporal change of the time interval and the crank angle speed decreases, however does not become zero. In FIG. 11, the solid line shows the time interval $\Delta Td$ without correction, and the broken line shows the time interval which becomes a target of correction by the correction value Kc. Therefore, even in the state of a combustion stop and a low load, unlike the present embodiment, if it is configured to change the correction value Kc so that the crank angle acceleration $\alpha d$ which is the time change rate of the crank angle speed $\omega d$ approaches zero, incorrect correction will occur.

On the other hand, the time interval and the crank angle speed become close to the behavior which increases or decreases by constant slope, and the temporal change of the crank angle acceleration $\alpha d$ approaches zero. Therefore, a suitable correction can be performed by changing the correction value Kc so that the angular acceleration change amount $\Delta\alpha d$ which is the time change amount of the crank angle acceleration $\alpha d$ approaches zero like the present embodiment.

In the present embodiment, in the case where a change permission condition, which the fuel supply to internal combustion engine 1 is stopped and the load of the internal combustion engine 1 is lower than a preliminarily set determination load, is satisfied, the correction value change unit 54 permits the change of the correction value Kc.

The correction value change unit 54 determines that the load of the internal combustion engine 1 is lower than the determination load, in the case of satisfying a condition which combined by AND any one or more conditions among a plurality of conditions, which are a conditions satisfied in the case where the opening degree of the throttle valve 4 which detected based on the output signal of the throttle position sensor 19 is lower than a preliminarily set determination opening degree, a condition satisfied in the case where the intake air amount taken into the internal combustion engine 1 (the cylinder 7) which detected based on the output signal of the air flow sensor 3 is lower than a preliminarily set determination air amount, a condition satisfied in the case where the pressure in the intake manifold 12 which detected based on the output signal of the manifold pressure sensor 8 is lower than a preliminarily set determination pressure, and a condition satisfied in the case where the charging efficiency of the internal combustion engine 1 is lower than a preliminarily set determination efficiency.

For example, the determination opening degree is preliminarily set to the opening degree which becomes less than or equal to 5% of the variation width of the opening degree of the throttle valve 4. The determination air amount is preliminarily set to the air amount which becomes less than or equal to 5% of the variation width of the intake air amount. The determination pressure is preliminarily set to the pressure which becomes less than or equal to 5% of the variation width of the pressure in the intake manifold 12. The determination efficiency is preliminarily set to the charging efficiency which becomes less than or equal to 5% of the variation width of the charging efficiency.

<Completion Determination of Change of Correction Value Kc>

Every time the crankshaft 2 rotates a preliminarily set determination angle (in this example, 360 deg), the correction value change unit 54 calculates a variation degree to an average value of the angular acceleration change amount $\Delta\alpha d$ about the angular acceleration change amount $\Delta\alpha d$ (or the crank angle jerk $\delta d$) for the determination angle. In the present embodiment, the correction value change unit 54 calculates a standard deviation $\sigma$ of the angular acceleration change amount $\Delta\alpha d$ (or the crank angle jerk $\delta d$) for the determination angle as the variation degree. In the case where an absolute value $|\Delta\sigma|$ of a change amount between the standard deviation $\sigma$ calculated last time and the standard deviation $\sigma$ calculated this time becomes less than a preliminarily set determination change amount $X\sigma$, the correction value change unit 54 determines that the change of the correction value Kc is completed, stops the change of the correction value Kc, and holds the correction value Kc.

When the correction value Kc of the each angle section Sd changes appropriately, the angular acceleration change amount $\Delta\alpha d$ of the each detected angle $\theta d$ approaches zero. Then, when the angular acceleration change amount $\Delta\alpha d$ of the each detected angle $\theta d$ approaches zero, the absolute value $|\Delta\sigma|$ of the change amount of the standard deviation $\sigma$ of the angular acceleration change amount $\Delta\alpha d$ decreases gradually. According to the above-mentioned configuration, in the case where the absolute value $|\Delta\sigma|$ of the change amount of standard deviation $\sigma$ decreases until the absolute value $|\Delta\sigma|$ becomes less than or equal to the determination change amount $X\sigma$, it can be determined that a suitable change of the correction value Kc is completed, and the change processing of the correction value Kc can be stopped. Therefore, the processing load of the controller 50 can be reduced. Even after the suitable change of correction value Kc is completed, by continuing the change processing of the correction value Kc, an incorrect change of the correction value Kc can be prevented from generating by a certain factor.

In the present embodiment, the correction value change unit 54 calculates the standard deviation $\sigma$ based on the data of N angular acceleration change amounts Δαd (in this example, 90 pieces) for the determination angle using an equation (8).

$$\sigma = \sqrt{\frac{1}{N-1}\left\{\sum_{n=1}^{N}\Delta\alpha d(n)^2 - \frac{1}{N}\left(\sum_{n=1}^{N}\Delta\alpha d(n)\right)^2\right\}} \quad (8)$$

As shown in an equation (9), every time the standard deviation σ is calculated M times, the correction value change unit 54 calculates an average value σave of M standard deviations σ. Then, the correction value change unit 54 calculates an absolute value of a value, obtained by dividing the difference between the average value σave (k−1) of the standard deviation calculated last time and the average value σave (k) of the standard deviation calculated this time by an average value σave (k) of the standard deviation calculated this time, as the absolute value |Δσ| of the change amount of the standard deviation. Therefore, the change amount of the standard deviation made dimensionless is calculated.

$$\sigma ave(k) = \frac{1}{M}\sum_{m=1}^{M}\sigma(m) \quad (9)$$

$$|\Delta\sigma| = \left|\frac{\sigma ave(k-1) - \sigma ave(k)}{\sigma ave(k)}\right|$$

<Change of Correction Value Kc Using Stored Data>

In the present embodiment, the angle information detection unit 51 stores the angle interval Δθd and the time interval ΔTd, in each of the angle sections Sd, which were detected in the case where the change permission condition, which the fuel supply to internal combustion engine 1 is stopped and the load of the internal combustion engine 1 is lower than a preliminarily set determination load, is satisfied. Then, the angle information correction unit 52, the angle information calculation unit 53, and the correction value change unit 54 perform processing to the angle interval Δθd and the time interval ΔTd in each of the stored angle sections Sd so as to change the correction value Kc.

According to this configuration, it becomes unnecessary to process in real time to the angle interval Δθd and the time interval ΔTd which were detected so as to change the correction value Kc. Accordingly, processing for changing the correction value Kc can be distributed in time and be performed. Therefore, the processing load of the controller 50 can be reduced and the processing performance required for the controller 50 can be reduced. Since the angle interval Δθd and the time interval ΔTd which were stored on the desirable conditions of combustion stop and low load can be used, the change accuracy of the correction value Kc can be improved.

In the case where the change permission conditions is satisfied, the angle information detection unit 51 stores the angle interval Δθd and the time interval ΔTd for a preliminarily set storage number of rotations to the rewritable storage apparatus 91 of the controller 50 such as RAM. The angle information detection unit 51 detects the crankshaft angle θd and the detected time Td. The angle information detection unit 51 counts up the storage number i every time the angle identification number n, the angle interval Δθd, and the time interval ΔTd are calculated. As shown in FIG. 12, the angle information detection unit 51 stores the angle identification number n, the angle interval Δθd, and the time interval ΔTd to the storage apparatus 91 by correlating with the counted-up storage number i.

The angle information correction unit 52 corrects the stored angle interval Δθd or the stored time interval ΔTd by the correction value Kc. The angle information calculation unit 53 calculates the crank angle speed ωd, the crank angle acceleration αd, and the angular acceleration change amount Δαd (or the crank angle jerk δd) based on the corrected angle interval Δθdc and the corrected time interval ΔTdc. The correction value change unit 54 changes the correction value Kc so that the angular acceleration change amount Δαd approaches zero.

The angle information correction unit 52, the angle information calculation unit 53, and the correction value change unit 54 perform processing for changing the correction value Kc by repeatedly using the stored angle interval Δθd and the stored time interval ΔTd for the storage number of rotations. The data stored on desirable conditions can be repeatedly used, and the correction value Kc can be changed with high precision.

<Flow Chart of Change Processing of Correction Value Kc>

Figure 13:
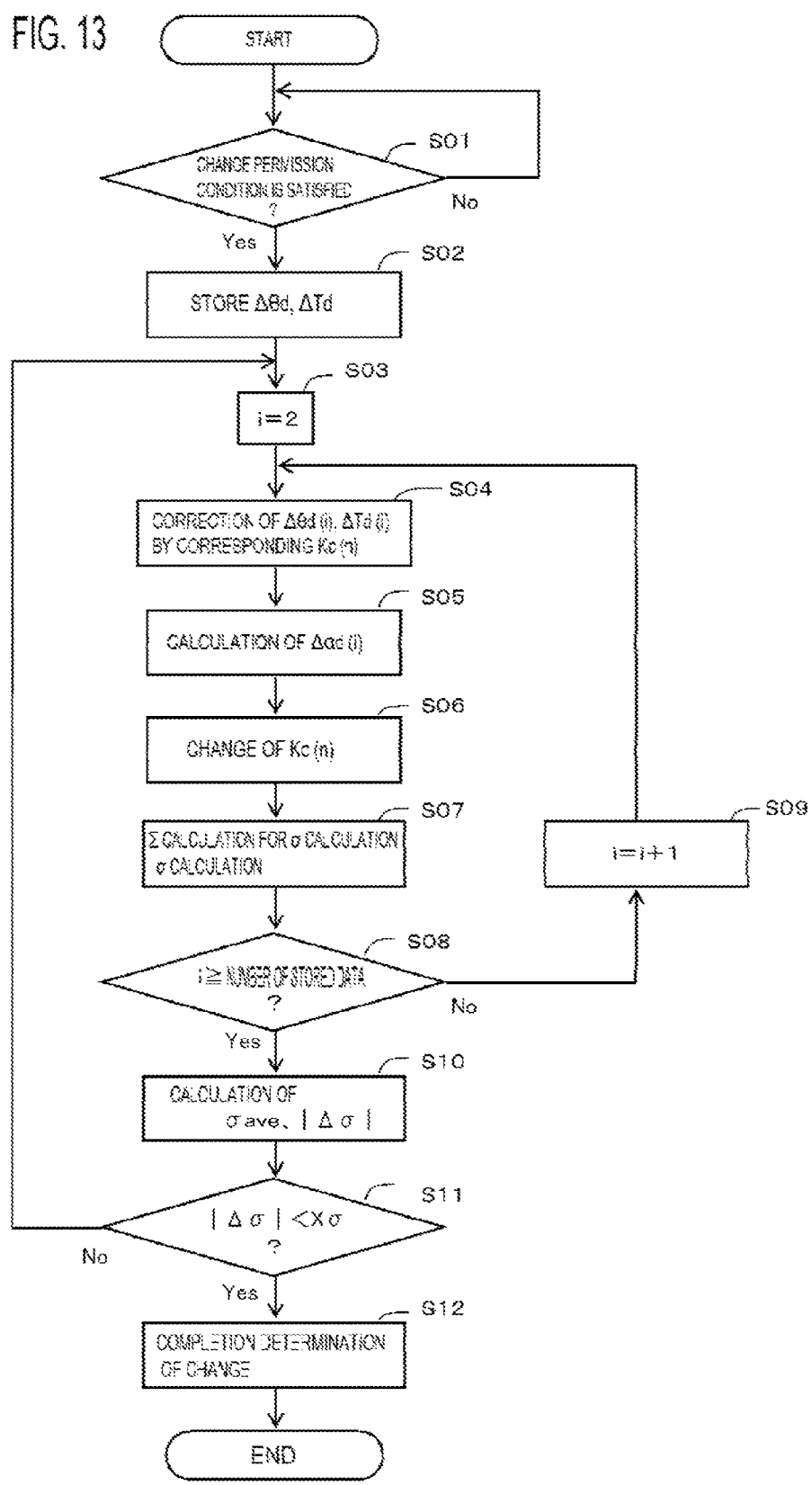
FIG. 13 is a flowchart showing a correction value change processing according to Embodiment 1 of the present invention.

Next, using the flow chart shown in FIG. 13, change processing of the correction value Kc according to the present embodiment is explained. First, in the step S01, the correction value change unit 54 determines whether or not the change permission condition, which the fuel supply to the internal combustion engine 1 is stopped and the load of the internal combustion engine 1 is lower than a preliminarily set determination load, is satisfied. In the case where the change permission condition is satisfied (the step S01: Yes), the angle information detection unit 51, as mentioned above, stores the angle interval Δθd and the time interval ΔTd which were detected. In this example, the data for the storage number of rotations is stored.

In the step S03, the correction value change unit 54 sets 2 as the storage number i. This is because calculation of the angular acceleration change amount Δαd requires the data of the just before one angle interval Δθd (i−1) and the just before one time interval ΔTd (i−1) in the present embodiment. Then, in the step S04, the angle information correction unit 52 corrects the angle interval Δθd or the time interval ΔTd corresponding to the storage number i by the correction value Kc of the angle identification number n corresponding to the storage number i. In the present embodiment, in order to calculate the angular acceleration change amount Δαd, the angle information correction unit 52 corrects the angle intervals Δθd or the time intervals ΔTd corresponding to one before, this time, one after, and two after storage number (i−1), (i), (i+1), (i+2) by the correction values Kc.

In the step S05, the angle information calculation unit 53 calculates the crank angle speed ωd, the crank angle acceleration αd, and the angular acceleration change amount Δαd (or the crank angle jerk δd) based on the corrected angle interval Δθdc and the corrected time interval ΔTdc corresponding to the storage number i. In the present embodiment, the angle information calculation unit 53 calculates the angular acceleration change amount Δαd (i) corresponding to the storage number i by use of the corrected angle intervals Δθdc and the corrected time intervals ΔTdc corresponding to one before, this time, one after, and two after storage number (i−1), (i), (i+1), (i+2).

In the step S06, the correction value change unit 54 changes the correction value Kc of the angle identification number n corresponding to the storage number i so that the angular acceleration change amount Δαd (i) (or the crank angle jerk δd) corresponding to the storage number i approaches zero.

In the step S07, the correction value change unit 54 calculates Σ of the angular acceleration change amount Δαd (or the crank angle jerk δd) in the equation (8) for calculating the standard deviation σ. The correction value change unit 54 calculates the standard deviation σ of the equation (8), in the case where N Σ (in this example, 90 pieces) for the determination angle are calculated.

In the step S08, the correction value change unit 54 determines whether or not the storage number i becomes more than or equal to the number of stored data for the storage number of rotations. In the case where the storage number i is less than the number of stored data (the step S08: No), in the step S09, the correction value change unit 54 adds 1 to the storage number i, returns to the step S04, and repeatedly performs processing of the step S04 to the step S07 using stored data of the next storage number i.

On the other hand, in the case where the storage number i is more than or equal to the number of stored data (the step S08: Yes), in the step S10, the correction value change unit 54 calculates the average value σave of the M standard deviations σ calculated during the storage number i increased from 2 to the number of stored data, using an equation (9). Then, the correction value change unit 54 calculates the absolute value |Δσ| of the change amount of the standard deviation based on the average value cave (k−1) of the standard deviation calculated last time and the average value cave (k−1) of the standard deviation calculated this time, using the equation (9).

In the step S11, the correction value change unit 54 determines whether or not the absolute value |Δσ| of the change amount of the standard deviation becomes less than the determination change amount Xσ. In the case where the absolute value |Δσ| of the change amount of the standard deviation is more than or equal to the determination change amount Xσ (the step S11: No), the correction value change unit 54 returns to the step S03, and repeatedly performs processing for changing the correction value Kc by use of the angle interval Δθd and the time interval ΔTd for the storage number of rotations which were stored. On the other hand, in the case where the absolute value |Δσ| of the change amount of the standard deviation is less than the determination change amount Xσ (the step S11: Yes), the correction value change unit 54 advances to the step S12, determines that the change of correction value Kc is completed, and ends the change processing of the correction value Kc.

<Correction Results by Correction Value Kc after Completion of Change>

Figure 14:
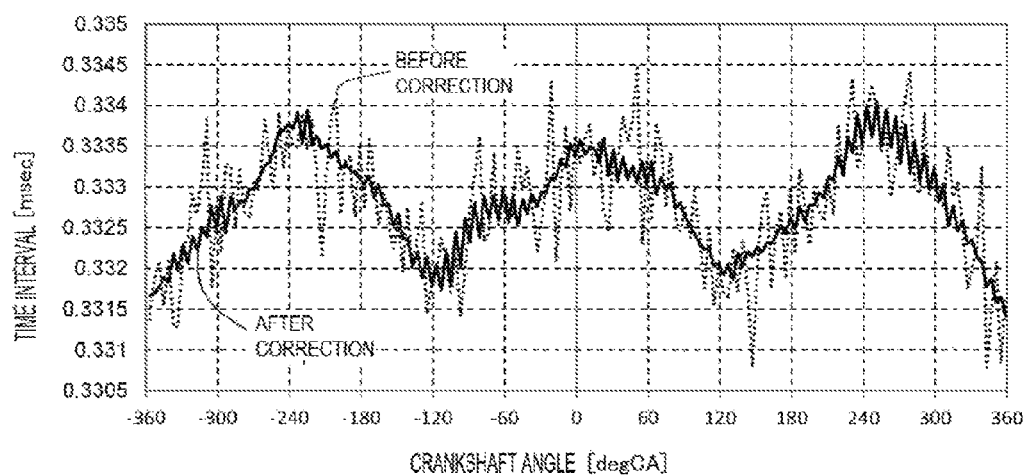
FIG. 14 is a chart which shows a behavior of a time interval without correction and with correction according to Embodiment 1 of the present invention.

FIG. 14 shows the correction results by the correction value Kc after the completion of change as a solid line. As shown by the broken line, a vibration component of high amplitude resulting from the tolerance of the tooth of the ring gear 25 is superimposed on the time interval ΔTd before correction by the correction value Kc. The amplitude of the corrected time interval ΔTdc by the correction value Kc after the completion of change is reduced rather than before correction, and the corrected time interval ΔTdc is approaching the correction target shown in FIG. 11. Therefore, the correction value Kc can correct well variation of the corrected time interval ΔTdc resulting from the tolerance of the tooth of ring gear 25.

Figure 15:
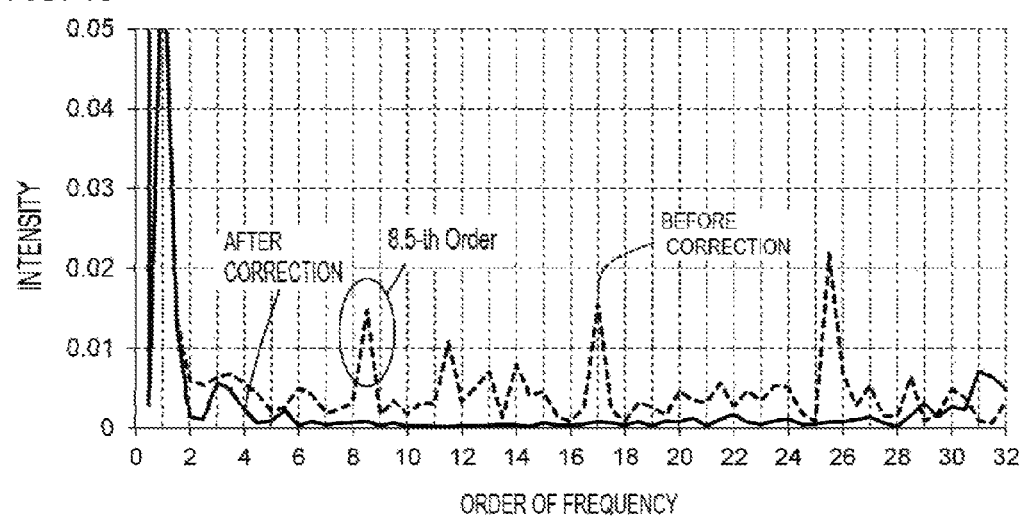
FIG. 15 is a figure showing a spectral-analysis result of a time interval without correction and with correction according to Embodiment 1 of the present invention.

FIG. 15 shows a spectral-analysis result of the time interval ΔTd before correction of FIG. 14 and the corrected time interval ΔTdc by the correction value Kc after the completion of change. In the spectral analysis, the time interval ΔTd corresponding to 4 deg is used as the data of one point, and a fast Fourier transform using the data of 64 points is used. The order of frequency in the horizontal axis indicates the sample position of the spectral-analysis result. The first-order frequency corresponds to about 0.7 times (=64/90) of rotational frequency of the crankshaft 2. The n-th-order frequency corresponds to n×0.7 times of rotational frequency of the crankshaft 2. By correction, the second- and higher-order frequency components are significantly reduced. Before correction, the frequency component of the 8.5th-order low frequency is large. Accordingly, in the case of performing a low pass filter processing which decreases the vibration component of the time interval ΔTd, it is necessary to set the cutoff frequency of the low pass filter processing to a frequency of less than or equal to the 8.5th-order, and cannot set the cutoff frequency to a high frequency of more than or equal to the 8.5th-order. On the other hand, about the corrected time interval ΔTdc, the frequency component can be significantly reduced till the high frequency around the 28th-order. Therefore, in the case of performing a low pass filter processing which decreases the vibration component of the corrected time interval ΔTdc, the cutoff frequency of the low pass filter processing can be raised significantly. Therefore, by correction, change of the time interval ΔTd of a high frequency band can be accurately detected, and estimation accuracy of such as cylinder internal pressure mentioned below can be improved.

<Cylinder-Internal-Pressure Estimation Unit 55>

The cylinder-internal-pressure estimation unit 55 calculates a combustion gas pressure torque Tb which generated by combustion, by use of an equation of motion of a rotation system of the crankshaft 2 containing piston, connecting rod, and crank of the internal combustion engine 1, based on the crankshaft angle θd and the crank angle acceleration αd; and estimates a cylinder internal pressure Pcylb of the cylinder b which is burning based on the combustion-gas-pressure torque Tb and the crankshaft angle θd.

In the present embodiment, in addition to the processing performed to the angle interval Δθd or the time interval ΔTd stored during satisfaction of the change permission condition for the change processing of the correction value Kc, the angle information correction unit 52 and the angle information calculation unit 53 correct, in real time, the angle interval Δθd or the time interval ΔTd, which calculated in real time, by the correction value Kc, and calculate the crank angle speed ωd and the crank angle acceleration ad in real time. The angle information calculation unit 53 performs a low pass filter processing to the corrected time interval ΔTdc or the crank angle acceleration αd, in order to reduce a noise component of high frequency.

The equation of motion of the rotation system of the crankshaft 2 containing piston, connecting rod, and crank of the internal combustion engine 1 can be expressed by an equation (10).

$$I \cdot \alpha d = \sum_{j=1}^{L} \{(Pcyl_j \cdot Sp + mp \cdot \alpha p_j) \cdot R_j\} - Tex \quad (10)$$

$$R_j = r \cdot (\sin\theta d_j + \tan\phi_j \cdot \cos\theta d_j)$$

Here, I is an inertia moment of crankshaft 2; Pcylj is the cylinder internal pressure of the j-th cylinder 7; Sp is a project area of a top face of the piston 5; mp is a mass of the piston 5; αpj is an acceleration of the piston 5 of the j-th cylinder 7; Rj is a conversion factor which converts a force which generated at the piston 5 of the j-th cylinder 7 into a torque around the crankshaft 2; Tex is an external load torque transmitted to the crankshaft 2 from outside, such as friction, load of auxiliary machine, and driving resistance. L is a number of the cylinders, and L is three (L=3) in the present embodiment. r is a radius of the crank; θdj is a crankshaft angle on the basis of the top dead center of the piston 5 of the j-th cylinder 7; φj is an angle of the connecting rod of the j-th cylinder 7, and is determined based on a connecting rod ratio which is a ratio of crank length and connecting rod length, and the crankshaft angle θdj.

The cylinder-internal-pressure estimation unit 55 calculates an acceleration αpj of the piston 5 of the each cylinder j based on the geometrical relation, of the connecting rod 9 and the crank 32, which changes according to the crankshaft angle θdj of the each cylinder j, and the crank angle acceleration αd. The cylinder-internal-pressure estimation unit 55 calculates a conversion factor Rj of the each cylinder j based on the crankshaft angle θdj of the each cylinder j.

A cylinder internal pressure Pcylj in the stroke other than the latter half of the compression stroke and the expansion stroke, in which combustion is performed, is a pressure corresponding to the pressure in the intake manifold 12, the atmospheric pressure, and the crankshaft angle θdj. The cylinder-internal-pressure estimation unit 55 estimates a cylinder internal pressure Pcylubj of the each unburnt cylinder j, which is in the intake stroke, the compression stroke (except the latter half), or the exhaust stroke, based on the pressure in the intake manifold 12, the atmospheric pressure, and the crankshaft angle θdj. In the case where the b-th cylinder 7 is in the latter half of the compression stroke or the expansion stroke, and combustion is performed, the equation (10) can be transformed like an equation (11). Here, Pcylb is the cylinder internal pressure of the combustion cylinder b; Pcylubj is the cylinder internal pressure of the each unburnt cylinder j (j!=b).

$$I \cdot \alpha d = (Pcyl_b \cdot Sp + mp \cdot \alpha p_b) \cdot R_b + \sum_{j=1, j \neq b}^{L} \{(Pcylub_j \cdot Sp + mp \cdot \alpha p_j) \cdot R_j\} - Tex \quad (11)$$

Since the first term of the right side of an equation (11) becomes zero in the case where the piston 5 of the combustion cylinder b is located at the top dead center, by rearranging the equation (11) with regarding to the external load torque Tex, it becomes like an equation (12). It is assumed that the external load torque Tex is a constant value estimated at the top dead center, since the external load torque Tex does not change wildly for 1 cycle.

$$Tex = \sum_{j=1, j \neq b}^{L} \{(Pcylub_j \cdot Sp + mp \cdot \alpha p_j) \cdot R_j\} - I \cdot \alpha d \quad (12)$$

By use of the equation (12), the cylinder-internal-pressure estimation unit 55 estimates the external load torque Tex based on the cylinder internal pressure Pcylubj, the acceleration αpj of the piston 5, and the conversion factor Rj of the each unburnt cylinder j, and the crank angle acceleration αd, in the case where the piston 5 of the combustion cylinder b is at the top dead center.

An equation (13) is obtained by rearranging an equation (11) with regarding to "Pcylb×Sp×Rb" which is corresponding to the combustion-gas-pressure torque Tb which generated in the crankshaft 2 by combustion.

$$\begin{aligned} T_b &= Pcyl_b \cdot Sp \cdot R_b \\ &= I \cdot \alpha d - mp \cdot \alpha p_b \cdot R_b - \\ &\quad \sum_{j=1, j \neq b}^{L} \{(Pcylub_j \cdot Sp + mp \cdot \alpha p_j) \cdot R_j\} + Tex \end{aligned} \quad (13)$$

The cylinder-internal-pressure estimation unit 55 estimates the combustion-gas-pressure torque Tb based on the crankshaft angle θd and the crank angle acceleration αd by use of the equation of motion of a rotation system of the crankshaft 2 shown in the equation (13). At this time, as mentioned above, the cylinder-internal-pressure estimation unit 55 calculates the acceleration αpb of the piston and the conversion factor Rb of the combustion cylinder b; the cylinder internal pressure Pcylubj, the acceleration αpj of the piston 5, and the conversion factor Rj of the each unburnt cylinder j; and the external load torque Tex.

Then, the cylinder-internal-pressure estimation unit 55 calculates the cylinder internal pressure Pcylb of the combustion cylinder b by dividing the combustion-gas-pressure torque Tb by the project area Sp of the piston 5 and the conversion factor Rb of the combustion cylinder b, as shown in an equation (14).

$$Pcyl_b = \frac{T_b}{Sp \cdot R_b} \quad (14)$$

<Combustion Parameter Calculation Unit 56>

The combustion parameter calculation unit 56 calculates the combustion parameter of one or both of a heat release rate and a mass combustion rate MFB based on the cylinder internal pressure Pcylb of the combustion cylinder b.

In the present embodiment, the combustion parameter calculation unit 56 calculates the heat release rate dQ/dθ per unit crankshaft angle using an equation (15). Here, κ is a ratio of specific heat; Vb is a cylinder volume of the combustion cylinder b. The combustion parameter calculation unit 56 calculates the cylinder volume Vb and the cylinder volume change rate dVb/dθ per unit crankshaft angle based on the geometrical relation of the crankshaft angle θdb, the connecting rod 9, and the crank 32 of the combustion cylinder b.

$$\frac{dQ}{d\theta} = \frac{\kappa}{\kappa - 1} Pcyl_b \cdot \frac{dV_b}{d\theta} + \frac{1}{\kappa - 1} V_b \frac{dPcyl_b}{d\theta} \quad (15)$$

By use of an equation (16), the combustion parameter calculation unit 56 calculates the mass combustion rate MFB of the each crankshaft angle θdb by dividing the momentary integral value which integrated with the heat release rate dQ/dθ from a combustion start angle θ0 to the crankshaft angle θdb by a total integral value Q0 which integrated with the heat release rate dQ/dθ over a whole combustion angle section.

$$MBF(\theta d_b) = \frac{\int_{\theta_0}^{\theta d_b} \frac{dQ}{d\theta} d\theta}{Q_0} \quad (16)$$

<Combustion Control Unit 57>

The combustion control unit 57 performs a combustion control which changes one or both of the ignition timing and the EGR amount based on the combustion parameter. In the present embodiment, the combustion control unit 57 determines a crankshaft angle θdb which the mass combustion rate MFB becomes 0.5 (50%) (referred to as a combustion central angle), and changes one or both of the ignition timing and the EGR amount so that the combustion central angle approaches a preliminarily set target angle. For example, in the case where the combustion central angle is on the retard angle side rather than the target angle, the combustion control unit 57 changes the ignition timing to the advance angle side, or increases the opening degree of the EGR valve 22 so as to increase the EGR amount. When the EGR amount increases, a combustion speed becomes slow and the combustion central angle changes to the advance angle side. On the other hand, in the case where the combustion central angle is on the advance angle side rather than the target angle, the combustion control unit 57 changes the ignition timing to the retard angle side, or decreases the opening degree of the EGR valve 22 so as to decrease the EGR amount.

Alternatively, the combustion control unit 57 may be configured to determine the crankshaft angle θdb which the heat release rate dQ/dθ becomes a maximum value, and change one or both of the ignition timing and the EGR amount so that the crankshaft angle θdb approaches a preliminarily set target angle.

<Improvement in Calculation Accuracy of Cylinder Internal Pressure, Heat Release Rate, and Mass Combustion Rate>

Using FIG. 16, in the case where the present embodiment which performs the correction by the correction value Kc, and in the case where the comparative example which does not perform the correction, a calculation accuracy of the cylinder internal pressure, the heat release rate, and the mass combustion rate is explained. The column on the left side of FIG. 16 shows behavior of each calculated value in the case where the comparative example which does not perform the correction by the correction value Kc. The column on the right side of FIG. 16 shows behavior of each calculated value in the case where the present embodiment which performed the correction by the correction value Kc after the completion of change.

In the case of the comparative example of the left side, as mentioned above, in order to remove the 8.5th-order frequency component superimposed on the time interval ΔTd, the low pass filter processing that the cutoff frequency is low is performed. On the other hand, in the case of the present embodiment of the right side, the cutoff frequency of the low pass filter processing is higher than the case of the comparative example (in this example, 12th-order). Accordingly, in the case of the comparative example of the left side, as compared with measured value, waveforms become smooth, especially the calculation accuracy of the heat release rate and the mass combustion rate MFB is getting worse. On the other hand, in the case of the present embodiment of the right side, even though compared with measured value, the smoothing of waveforms is small and the calculation accuracy of especially the heat release rate and the mass combustion rate MFB is improving significantly. Therefore, in the present embodiment, the control accuracy of the combustion control which used the combustion parameter of the heat release rate and the mass combustion rate MFB can be improved.

<Outline Flowchart of Whole Processing>

Figure 17:
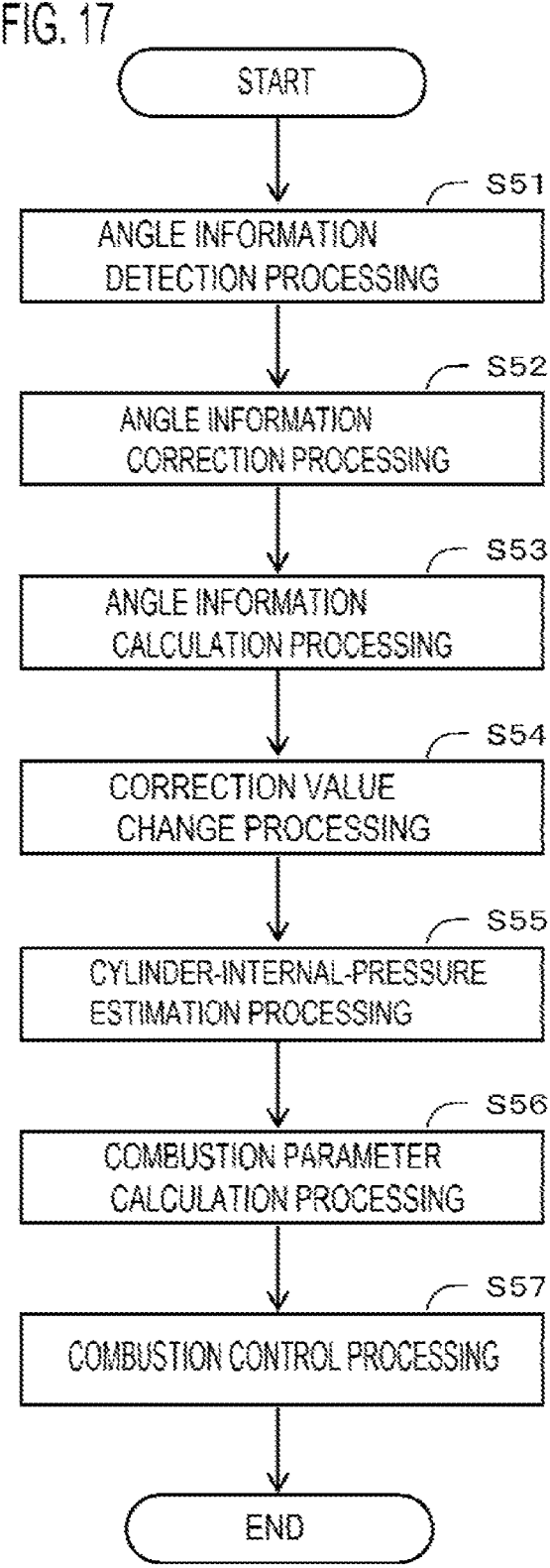
FIG. 17 is a flow chart which shows schematic processing of a controller according to Embodiment 1 of the present invention.

The procedure (the control method of the internal combustion engine 1) of schematic processing of the controller 50 according to the present embodiment is explained based on the flow chart shown in FIG. 17. The processing represented in the flowchart in FIG. 17 is recurrently implemented, for example, every constant operation cycle while the computing processing unit 90 implements software (a program) stored in the storage apparatus 91.

In the step S51, as mentioned above, the angle information detection unit 51 implements an angle information detection processing (an angle information detection step, an angle information detecting) to detect the detected angle θd and the detected time Td based on the output signal of the specific crank angle sensor 6, and calculate the angle interval Δθd based on the detected angle θd and the detected time Td.

Next, in the step S52, as mentioned above, the angle information correction unit 52 implements an angle information correction processing (an angle information correction step, an angle information correcting) to correct the angle interval Δθd or the time interval ΔTd in each of the angle sections Sd by the correction value Kc provided one corresponding to each of the angle sections Sd.

In the step S53, as mentioned above, the angle information calculation unit 53 implements an angle information calculation processing (an angle information calculation step, an angle information calculating) to calculate the crank angle speed ωd, the crank angle acceleration αd, and the angular acceleration change amount Δαd (or the crank angle jerk δd), corresponding to each of the detected angles θd or the angle sections Sd, based on the corrected angle interval Δθdc and the corrected time interval ΔTdc by the correction value Kc.

Then, in the step S54, as mentioned above, the correction value change unit 54 implements a correction value change processing (a correction value change step, a correction value changing) to change the correction value Kc in each of the angle sections Sd so that the angular acceleration change amount Δαd (or crank angle jerk δd) in each of the detected angles θd or the angle sections Sd approaches zero.

In the step S55, as mentioned above, the cylinder-internal-pressure estimation unit 55 implements a cylinder-internal-pressure estimation processing (a cylinder-internal-pressure estimation step, a cylinder-internal-pressure estimating) to calculate the combustion gas pressure torque Tb, by use of the equation of motion of a rotation system of the crankshaft 2 containing piston, connecting rod, and crank of the internal combustion engine 1, based on the crankshaft angle θd and the crank angle acceleration αd; and estimate the cylinder internal pressure Pcylb of the combustion cylinder b based on the combustion-gas-pressure torque Tb and the crankshaft angle θd.

In the step S56, as mentioned above, the combustion parameter calculation unit 56 implements a combustion parameter calculation processing (a combustion parameter calculation step, a combustion parameter calculating) to calculate the combustion parameter of one or both of the heat release rate and the mass combustion rate MFB based on the cylinder internal pressure Pcylb of the combustion cylinder b.

Then, in the step S57, as mentioned above, the combustion control unit 57 implements a combustion control processing (a combustion control step, a combustion controlling) to change one or both of the ignition timing and the EGR amount based on the combustion parameter.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the second crank angle sensor 6 corresponds to "the specific crank angle sensor" in the present invention, the flywheel 27 corresponds to "the rotation member" in the present invention, the tooth of ring gear 25 provided in flywheel 27 corresponds to the "the detected unit" in this present invention. However, embodiments of the present invention are not limited to the foregoing case. That is to say, the first crank angle sensor 11 may correspond to "the specific crank angle sensor" in the present invention, the signal plate 10 may correspond to "the rotation member" in the present invention, a plurality of teeth provided in the signal plate 10 may correspond to the "the detected unit" in the present invention.

(2) In the above-mentioned Embodiment 1, there has been explained the case where the internal combustion engine 1 is a gasoline engine. However, embodiments of the present invention are not limited to the foregoing case. That is to say, the internal combustion engine 1 may be various kinds of internal combustion engines, such as a diesel engine and an engine which performs HCCI combustion (Homogeneous-Charge Compression Ignition Combustion).

Figure 18:
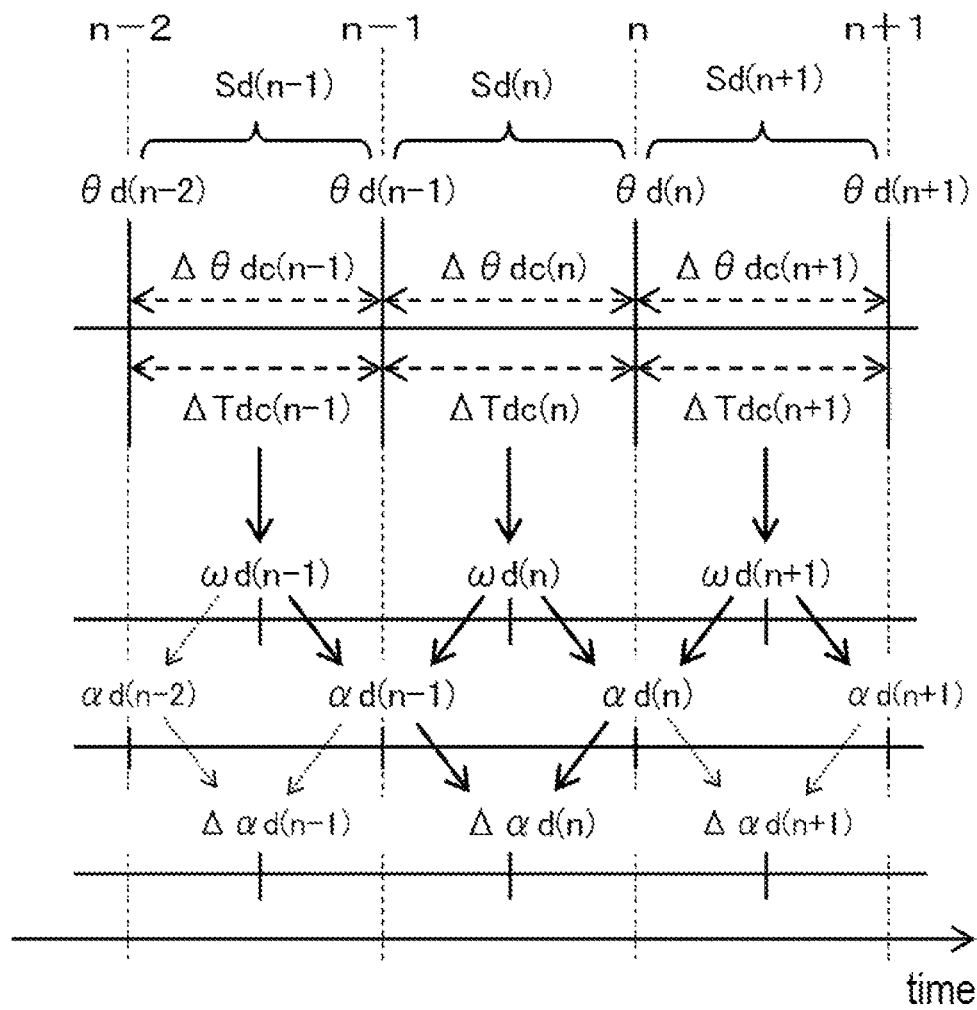
FIG. 18 is a time chart for explaining an angle information calculation processing according to other embodiments of the present invention.

(3) In the above-mentioned Embodiment 1, as explained using FIG. 7, there has been explained the case where the angle information calculation unit 53 calculates the crank angle speeds ωd in each of the just before two and just after two angle sections Sd of the object detected angle θd (n); calculates the crank angle acceleration αd (n−1) corresponding to the just before two angle sections Sd, and the one crank angle acceleration αd (n+1) corresponding to the just after two angle sections Sd; and calculates the one angular acceleration change amount Δαd (n) corresponding to the object detected angle θd (n) based on the these two crank angle accelerations. However, embodiments of the present invention are not limited to the foregoing case. That is to say, the angle information calculation unit 53 may use any calculation method, as long as it calculates the crank angle speed ωd, the crank angle acceleration αd, and the angular acceleration change amount Δαd, corresponding to each of the detected angles θd or the angle sections Sd, based on the corrected angle interval Δθdc and the corrected time interval ΔTdc, For example, as shown in FIG. 18, based on the corrected angle interval Δθdc and the corrected time interval ΔTdc in each of the object angle section Sd (n) which is the angle section Sd at which the angular acceleration change amount Δαd (n) is calculated, the just before one angle section Sd (n−1) of the object angle section Sd (n), and the just after one angle section Sd (n+1) of the object angle section Sd (n), the angle information calculation unit 53 may calculate the crank angle speed ωd (n−1), ωd (n), ωd (n+1) in each of the just before one angle section Sd (n−1), the object angle section Sd (n), and the just after one angle section Sd (n+1). Then, based on the crank angle speed ωd (n−1), ωd (n) and the time intervals ΔTd (n−1), ΔTd (n) in each of the just before one angle section Sd (n−1) and the object angle section Sd (n), the angle information calculation unit 53 may calculate the one crank angle acceleration αd (n−1) corresponding to these two angle sections Sd. And, based on the crank angle speed ωd (n), ωd (n+1) and the time interval ΔTd (n), ΔTd (n+1) in each of the object angle section Sd (n) and the just after one angle section Sd (n+1), the angle information calculation unit 53 may calculate the one crank angle acceleration αd (n) corresponding to these two angle sections Sd. Then, based on the two crank angle acceleration αd (n−1), αd (n), the angle information calculation unit 53 may calculate the one angular acceleration change amount Δαd (n) corresponding to the object angle section Sd (n).

(4) In the above-mentioned Embodiment 1, There has been explained the case where the angle information calculation unit 53 calculates the angular acceleration change amount Δαd corresponding to each of the detected angles θd; the correction value change unit 54 changes one or both of the correction value Kc (n) of the just before one angle section Sd(n) and the correction value Kc (n+1) of the just after one angle section Sd (n+1) of the object detected angle θd (n) so that the angular acceleration change amount Δαd (n) of the object detected angle θd (n) approaches zero. However, embodiments of the present invention are not limited to the foregoing case. That is to say, as explained using FIG. 18, the angle information calculation unit 53 may calculate the angular acceleration change amount Δαd corresponding to each of the angle sections Sd; the correction value change unit 54 may change the correction value Kc (n) of the object angle section Sd (n) so that the angular acceleration change amount Δαd (n) of the object angle section Sd (n) which is the angle section made into a processing object approaches zero.

Specifically, in the case of correcting the angle interval Δθd by the correction value Kc; in the case where the angular acceleration change amount Δαd (n) of the object angle section Sd (n) is a positive value, the correction value change unit 54 may perform an increase correction to which the correction value Kc (n) is changed so as to increase the corrected angle interval Δθdc (n) of the object angle section Sd (n); in the case where the angular acceleration change amount Δαd (n) of the object angle section Sd (n) is a negative value, the correction value change unit 54 may perform a decrease correction to which the correction value Kc (n) is changed so as to decrease the corrected angle interval Δθdc (n) of the object angle section Sd (n). Alternatively, in the case of correcting the time interval ΔTd by the correction value Kc; in the case where the angular acceleration change amount Δαd (n) of the object angle section Sd (n) is a positive value, the correction value change unit 54 may perform a decrease correction to which the correction value Kc (n) is changed so as to decrease the corrected time interval ΔTdc (n) of the object angle section Sd (n); in the case where the angular acceleration change amount Δαd (n) of the object angle section Sd (n) is a negative value, the correction value change unit 54 may perform an increase correction to which the correction value Kc (n) is changed so as to increase the corrected time interval ΔTdc (n) of the object angle section Sd (n).

(5) In the above-mentioned Embodiment 1, there has been explained the case where the correction value change unit 54 permits the change of the correction value Kc in the case where the change permission condition, which the fuel supply to the internal combustion engine 1 is stopped and the load of the internal combustion engine 1 is lower than the determination load, is satisfied. However, embodiments of the present invention are not limited to the foregoing case. That is to say, the change permission conditions may be appropriate condition which is different from the Embodiment 1, or the change permission condition may not be provided.

(6) In the above-mentioned Embodiment 1, there has been explained the case where the angle information correction unit 52, the angle information calculation unit 53, and the correction value change unit 54 perform processing to the angle interval $\Delta\theta d$ and the time interval $\Delta Td$, in each of the angle sections Sd, stored in the case where the change permission condition is satisfied so as to change the correction value Kc. However, embodiments of the present invention are not limited to the foregoing case. That is to say, the angle information correction unit 52, the angle information calculation unit 53, and the correction value change unit 54 may perform processing in real time to the angle interval $\Delta\theta d$ or the time interval $\Delta Td$ in each of the angle sections Sd calculated in real time, and change the correction value Kc.

(7) In the above-mentioned Embodiment 1, there has been explained the case where the correction value change unit 54 calculates the standard deviation $\sigma$ of the angular acceleration change amount $\Delta\alpha d$ for the determination angle; in the case where the absolute value $|\Delta\sigma|$ of the change amount between the last time calculated value and this time calculated value of the standard deviation $\sigma$ becomes less than the determination change amount, the correction value change unit 54 stops the change of the correction value Kc, and holds the correction value Kc. However, embodiments of the present invention are not limited to the foregoing case. That is to say, the correction value change unit 54 may not stop the change of the correction value Kc. Alternatively, in the case where condition other than the condition by the absolute value $|\Delta\sigma|$ of the change amount of the standard deviation $\sigma$ is satisfied, for example, in the case where the standard deviation becomes less than or equal to a preliminarily set determination deviation, the correction value change unit 54 may stop the change of the correction value Kc and hold the correction value Kc.

(8) In the above-mentioned Embodiment 1, there has been explained the case where, based on the crank angle speed $\omega d$ and the crank angle acceleration $\alpha d$ which are calculated based on the corrected angle interval $\Delta\theta dc$ and the corrected time interval $\Delta Tdc$ by the correction value Kc, the controller 50 calculates the cylinder internal pressure, the heat release rate, and the mass combustion rate, and performs the combustion control. However, embodiments of the present invention are not limited to the foregoing case. That is to say, the controller 50 may perform other control, such as misfire detecting of combustion of the each cylinder 7, based on the crank angle speed $\omega d$ and the crank angle acceleration $\alpha d$ which are calculated based on the corrected angle interval $\Delta\theta dc$ and the corrected time interval $\Delta Tdc$.

(9) In the above-mentioned Embodiment 1, there has been explained the case where the correction value change unit 54 calculates the standard deviation $\sigma$ of the angular acceleration change amount $\Delta\alpha d$ for the determination angle as the variation degree. However, embodiments of the present invention are not limited to the foregoing case. That is to say, the correction value change unit 54 may calculate a variance $\sigma^2$ of the angular acceleration change amount $\Delta\alpha d$ for the determination angle as the variation degree. The correction value change unit 54 calculates the variance $\sigma^2$ using the equation (17) corresponding to a square of the standard deviation $\sigma$ of the equation (8).

$$\sigma^2 = \frac{1}{N-1}\left\{\sum_{n=1}^{N}\Delta\alpha d(n)^2 - \frac{1}{N}\left(\sum_{n=1}^{N}\Delta\alpha d(n)\right)^2\right\} \quad (17)$$

Various modifications and alterations of this invention will be apparent to those skilled in the art without departing from the scope and spirit of this invention, and it should be understood that this is not limited to the illustrative embodiments set forth herein.

What is claimed is:

1. A controller for an internal combustion engine that is provided with a plurality of detected units provided in a rotation member, which rotates integrally with a crankshaft, at a plurality of preliminarily set crankshaft angles, and a specific crank angle sensor which is fixed to a nonrotation member and detects the detected units provided in the rotation member, the controller for an internal combustion engine comprising:
   an angle information detector that detects a crankshaft angle based on an output signal of the specific crank angle sensor and detects a detected time which detected the crankshaft angle, and based on a detected angle, which is the detected crankshaft angle, and the detected time, calculates an angle interval and a time interval corresponding to an angle section between the detected angles;
   an angle information correction calculator that corrects the angle interval or the time interval in each of the angle sections by a correction value provided one corresponding to each of the angle sections;
   an angle information calculator that calculates a crank angle speed which is a time change rate of the crankshaft angle, a crank angle acceleration which is a time change rate of the crank angle speed, and an angular acceleration change amount which is a time change amount of the crank angle acceleration, corresponding to each of the detected angles or the angle sections, based on the corrected angle interval and the corrected time interval by the correction value in each of the angle sections;
   a correction value change calculator that changes the correction value in each of the angle sections so that the angular acceleration change amount in each of the detected angles or the angle sections approaches zero;
   a cylinder-internal-pressure estimation calculator that calculates a gas pressure torque which generated by combustion, by use of an equation of motion of a rotation system of the crankshaft containing piston, connecting rod, and crank of the internal combustion engine, based on the crankshaft angle and the crank angle acceleration; and estimates a cylinder internal pressure of a cylinder which is burning based on the gas pressure torque and the crankshaft angle;
   a combustion parameter calculator that estimates a combustion parameter of one or both of a heat release rate and a mass combustion rate based on the cylinder internal pressure; and
   a combustion controller that changes one or both of an ignition timing and an EGR amount based on the combustion parameter.

2. The controller for the internal combustion engine according to claim 1, wherein the correction value change calculator permits the change of the correction value in the case where the fuel supply to the internal combustion engine is stopped and the load of the internal combustion engine is lower than a preliminarily set determination load.

3. The controller for the internal combustion engine according to claim 1, wherein the angle information detector stores the angle interval and the time interval in each of the detected angle sections in the case where the fuel supply to the internal combustion engine is stopped and the load of the internal combustion engine is lower than a preliminarily set determination load, and wherein the angle information correction calculator, the angle information calculator, and the correction value change calculator perform processing to the angle interval and the time interval in each of the stored angle sections so as to change the correction value.

4. The controller for the internal combustion engine according to claim 2, wherein the correction value change calculator determines that the load of the internal combustion engine is lower than the determination load, in the case of satisfying a condition which combined by AND any one or more conditions among a plurality of conditions which are a condition satisfied in the case where an opening degree of a throttle valve of the internal combustion engine is lower than a preliminarily set determination opening degree, a condition satisfied in the case where an intake air amount taken into the internal combustion engine is lower than a preliminarily set determination air amount, a condition satisfied in the case where a pressure in an intake manifold of the internal combustion engine is lower than a preliminarily set determination pressure, and a condition satisfied in the case where a charging efficiency of the internal combustion engine is lower than a preliminarily set determination efficiency.

5. The controller for the internal combustion engine according to claim 1, wherein the angle information calculator, based on the corrected angle interval and the corrected time interval in each of the just before two angle sections and the just after two angle sections of an object detected angle which is the detected angle at which the angular acceleration change amount is calculated, calculates the crank angle speed in each of the just before two angle sections and the just after two angle sections;

based on the crank angle speed and the time interval in each of the just before two angle sections, calculates the one crank angle acceleration corresponding to the just before two angle sections;

based on the crank angle speed and the time interval in each of the just after two angle sections, calculates the one crank angle acceleration corresponding to the just after two angle sections; and based on the crank angle acceleration corresponding to the just before two angle sections and the crank angle acceleration corresponding to the just after two angle sections, calculates the one angular acceleration change amount corresponding to the object detected angle.

6. The controller for the internal combustion engine according to claim 1, wherein the angle information calculator calculates the angular acceleration change amount corresponding to each of the detected angles, wherein the correction value change calculator, in the case of correcting the angle interval by the correction value, and in the case where the angular acceleration change amount of an object detected angle which is the detected angle made into a processing object is a positive value, performs one or both of an increase correction to which the correction value of the just before one angle section of the object detected angle is changed so as to increase the corrected angle interval of the just before one angle section, and a decrease correction to which the correction value of the just after one angle section of the object detected angle is changed so as to decrease the corrected angle interval of the just after one angle section, in the case where the angular acceleration change amount of the object detected angle is a negative value, performs one or both of a decrease correction to which the correction value of the just before one angle section of the object detected angle is changed so as to decrease the corrected angle interval of the just before one angle section, and an increase correction to which the correction value of the just after one angle section of the object detected angle is changed so as to increase the corrected angle interval of the just after one angle section;

alternatively, in the case of correcting the time interval by the correction value, and in the case where the angular acceleration change amount of the object detected angle is a positive value, performs one or both of a decrease correction to which the correction value of the just before one angle section of the object detected angle is changed so as to decrease the corrected time interval of the just before one angle section, and an increase correction to which the correction value of the just after one angle section of the object detected angle is changed so as to increase the corrected time interval of the just after one angle section, in the case where the angular acceleration change amount of the object detected angle is a negative value, performs one or both of an increase correction to which the correction value of the just before one angle section of the object detected angle is changed so as to increase the corrected time interval of the just before one angle section, and a decrease correction to which the correction value of the just after one angle section of the object detected angle is changed so as to decrease the corrected time interval of the just after one angle section.

7. The controller for the internal combustion engine according to claim 1, wherein the angle information calculator calculates the angular acceleration change amount corresponding to each of the angle sections, wherein the correction value change calculator, in the case of correcting the angle interval by the correction value, and in the case where the angular acceleration change amount of an object angle section which is the angle section made into a processing object is a positive value, performs an increase correction to which the correction value is changed so as to increase the corrected angle interval of the object angle section, in the case where the angular acceleration change amount of the object angle section is a negative value, performs a decrease correction to which the correction value is changed so as to decrease the corrected angle interval of the object angle section;

alternatively, in the case of correcting the time interval by the correction value, and in the case where the angular acceleration change amount of the object angle section is a positive value, performs a decrease correction to which the correction value is changed so as to decrease the corrected time interval of the object angle section, in the case where the angular acceleration change amount of the object angle section is a negative value, performs an increase correction to which the correction value is changed so as to increase the corrected time interval of the object angle section.

8. The controller for the internal combustion engine according to claim 1, wherein the correction value change calculator, every time the crankshaft rotates a preliminarily set determination angle, calculates a variation degree to an average value of the angular acceleration change amount about the angular acceleration change amount for the determination angle, and in the case where an absolute value of a change amount between the variation degree calculated last time and the variation degree calculated this time becomes less than a preliminarily set determination change amount, stops the change of the correction value, and holds the correction value.

9. The controller for the internal combustion engine according to claim 1, wherein the angle information calculator calculates the crank angle jerk which is a time change rate of the crank angle acceleration as the angular acceleration change amount.

10. A control method for an internal combustion engine that is provided with a plurality of detected units provided in a rotation member, which rotates integrally with a crankshaft, at a plurality of preliminarily set crankshaft angles, and a specific crank angle sensor which is fixed to a nonrotation member and detects the detected units provided in the rotation member, the control method for an internal combustion engine comprising:

detecting a crankshaft angle based on an output signal of the specific crank angle sensor and detecting a detected time which detected the crankshaft angle, and based on a detected angle, which is the detected crankshaft angle, and the detected time, calculating an angle interval and a time interval corresponding to an angle section between the detected angles;

correcting the angle interval or the time interval in each of the angle sections by a correction value provided one corresponding to each of the angle sections;

calculating a crank angle speed which is a time change rate of the crankshaft angle, a crank angle acceleration which is a time change rate of the crank angle speed, and an angular acceleration change amount which is a time change amount of the crank angle acceleration, corresponding to each of the detected angles or the angle sections, based on the corrected angle interval and the corrected time interval by the correction value in each of the angle sections;

changing the correction value in each of the angle sections so that the angular acceleration change amount in each of the detected angles or the angle sections approaches zero;

calculating a gas pressure torque which generated by combustion, by use of an equation of motion of a rotation system of the crankshaft containing piston, connecting rod, and crank of the internal combustion engine, based on the crankshaft angle and the crank angle acceleration;

estimating a cylinder internal pressure of a cylinder which is burning based on the gas pressure torque and the crankshaft angle;

estimating a combustion parameter of one or both of a heat release rate and a mass combustion rate based on the cylinder internal pressure; and changing one or both of an ignition timing and an EGR amount based on the combustion parameter.

\* \* \* \* \*